US012583564B2

(12) United States Patent
Oda et al.

(10) Patent No.: US 12,583,564 B2
(45) Date of Patent: Mar. 24, 2026

(54) SEAFARER SAFETY DEVICE, SEAFARER SAFETY SYSTEM, SEAFARER SAFETY PROGRAM, VESSEL ACTIVITY INFERENCE DEVICE, REPORT GENERATION ASSISTANCE SYSTEM, AND VESSEL ACTIVITY INFERENCE PROGRAM

(71) Applicants: Kagoshima University, Kagoshima (JP); Ocean Solution Technology Kabushiki Kaisha, Nagasaki (JP); Sasebo Kokai Sokkisha Co., Ltd., Nagasaki (JP); Neos Corporation, Tokyo (JP)

(72) Inventors: Kentaro Oda, Kagoshima (JP); Yosuke Mizukami, Nagasaki (JP); Kaito Yamao, Nagasaki (JP); Hideki Miyagishima, Tokyo (JP); Naoya Yamamoto, Tokyo (JP)

(73) Assignees: Kagoshima University, Kagoshima (JP); Ocean Solution Technology Kabushiki Kaisha, Nagasaki (JP); Sasebo Kokai Sokkisha Co., Ltd., Nagasaki (JP); Neos Corporation, Tokyo (JP)

( * ) Notice: Subject to any disclaimer, the term of this patent is extended or adjusted under 35 U.S.C. 154(b) by 0 days.

(21) Appl. No.: 18/997,762

(22) PCT Filed: Jul. 25, 2023

(86) PCT No.: PCT/JP2023/027254

§ 371 (c)(1),
(2) Date: Jan. 22, 2025

(87) PCT Pub. No.: WO2024/024799

PCT Pub. Date: Feb. 1, 2024

(65) Prior Publication Data

US 2025/0263155 A1 Aug. 21, 2025

(30) Foreign Application Priority Data

Jul. 26, 2022 (JP) ................................ 2022-119000

(51) Int. Cl.
*B63C 9/00* (2006.01)
*G08B 21/08* (2006.01)
*G08B 25/00* (2006.01)

(52) U.S. Cl.
CPC .......... *B63C 9/0005* (2013.01); *G08B 21/088* (2013.01); *G08B 25/001* (2013.01)

(58) Field of Classification Search
CPC .... B63C 9/0005; G08B 21/088; G08B 25/001
See application file for complete search history.

(56) References Cited

U.S. PATENT DOCUMENTS 4,652,884 A * 3/1987 Starker ................ G01S 19/425 342/356
5,191,341 A * 3/1993 Gouard .................... G08G 3/00 342/41

(Continued)

FOREIGN PATENT DOCUMENTS

CN 114139642 A 3/2022
CN 114155446 A 3/2022

(Continued)

OTHER PUBLICATIONS

International Search Report and Written Opinion, mailed Oct. 17, 2023, for International Application Serial No. PCT/JP2023/027254 filed on Jul. 25, 2023. (Original and English translation enclosed).

(Continued)

*Primary Examiner* — Curtis J King
(74) *Attorney, Agent, or Firm* — K&L Gates; Brian J. Novak; Giorgios N. Kefallinos

(57) ABSTRACT

A seafarer safety device (500) includes an evaluator (510*a*) and an inboard outputter (510*k*). The evaluator (510*a*)

(Continued)

executes an evaluation process of evaluating whether a crew in emergency circumstances, on the basis of the intensities of notification radio waves indicating the existence of the crew on a craft and transmitted from a wearable transmitting device that repetitively transmits the notification radio waves, and on the basis of the strengths of rocking motions of the craft detected by a craft rocking-motion sensor that detects the strengths of rocking motions. The inboard outputter (510*k*) outputs, to an alarm unit, an emergency evaluation signal indicating a result of evaluation, when the evaluator (510*a*) evaluates that the crew is in emergency circumstances.

14 Claims, 13 Drawing Sheets

(56) References Cited

U.S. PATENT DOCUMENTS

| | | | | |
|---|---|---|---|---|
| 5,694,939 | A * | 12/1997 | Cowings | A61B 5/6804 600/27 |
| 6,459,372 | B1 * | 10/2002 | Branham | A01K 29/00 340/573.2 |
| 6,567,004 | B1 * | 5/2003 | Landa | G08B 21/0211 340/568.1 |
| 6,567,792 | B1 * | 5/2003 | Arnold | A01K 97/00 701/493 |
| 6,658,349 | B2 * | 12/2003 | Cline | G06Q 10/08 340/992 |
| 7,128,705 | B2 * | 10/2006 | Brendley | A61M 21/00 348/148 |
| 7,492,251 | B1 * | 2/2009 | Katz | G01S 19/17 340/539.22 |
| 2008/0228515 | A1 * | 9/2008 | Tachikawa | G06Q 10/08 705/1.1 |
| 2014/0114509 | A1 * | 4/2014 | Venables | B63B 39/06 701/21 |
| 2018/0348007 | A1 | 12/2018 | Adachi | |
| 2021/0327247 | A1 * | 10/2021 | Lim | B63C 9/0005 |
| 2022/0120892 | A1 | 4/2022 | Senzaki | |
| 2023/0257953 | A1 * | 8/2023 | Kubota | E04H 3/02 114/263 |
| 2025/0171122 | A1 * | 5/2025 | Alley | B63C 9/22 |

FOREIGN PATENT DOCUMENTS

| | | | |
|---|---|---|---|
| JP | 2004-354069 | A | 12/2004 |
| JP | 2008-225614 | A | 9/2008 |
| JP | 2010-236866 | A | 10/2010 |
| JP | 2020-008492 | A | 1/2020 |
| JP | 2021-157722 | A | 10/2021 |
| JP | 7093139 | B1 | 6/2022 |
| WO | 2017/138127 | A1 | 8/2017 |
| WO | 2020/161843 | A1 | 8/2020 |

OTHER PUBLICATIONS

Communication pursuant to Rule 164(1) EPC dated Nov. 28, 2025, issued for the corresponding EP patent application No. 23846529.8.

* cited by examiner

SEAFARER SAFETY DEVICE, SEAFARER SAFETY SYSTEM, SEAFARER SAFETY PROGRAM, VESSEL ACTIVITY INFERENCE DEVICE, REPORT GENERATION ASSISTANCE SYSTEM, AND VESSEL ACTIVITY INFERENCE PROGRAM

CROSS REFERENCE TO RELATED APPLICATION(S)

This application is a national phase filing of International Application Serial No. PCT/JP2023/027254, filed on Jul. 25, 2023, which claims the benefit of priority to Japanese Patent Application Serial No. 2022-119000, filed on Jul. 26, 2022, the entire disclosures each of which are incorporated herein by reference.

TECHNICAL FIELD

The present disclosure relates to a crew watching apparatus, a crew watching system, a crew watching program, a craft activity estimating apparatus, a report generation assistance system, and a craft activity estimating program.

BACKGROUND ART

As disclosed in Patent Literature 1, a system has been known including a transmitting device worn by a crew, and a management device that receives radio waves transmitted from the transmitting device and thus manages the location of the crew.

As disclosed in Patent Literature 2, another system has been known that facilitates generation of a report for reporting achievements of a navigation. The process of facilitating generation of a report uses data, such as craft location data indicating the locations of a craft during a navigation.

CITATION LIST

Patent Literature

Patent Literature 1: Unexamined Japanese Patent Application Publication No. 2020-8492

Patent Literature 2: Unexamined Japanese Patent Application Publication No. 2021-157722

SUMMARY OF INVENTION

Technical Problem

The system disclosed in Patent Literature 1 evaluates whether the crew is in emergency circumstances and needs an alarm, on the basis of only the level of attenuation of radio waves received from the transmitting device by the management device. The system having such a simple configuration may find it difficult to properly detect emergency circumstances.

A first objective of the present disclosure, which has been accomplished to solve the above problem, is to provide a device designed to monitor crew members, detect emergency situations, and trigger appropriate responses to ensure their safety.

In the system disclosed in Patent Literature 2, the vessel's location data is used solely to pinpoint the exact location of the fishing operation. The system disclosed in Patent Literature 2 lacks the capability to automatically infer the specific activities undertaken during the vessel's navigation.

This limitation prevents the system from realizing potential benefits, such as streamlined report generation.

A second objective of the present disclosure, which has been accomplished to solve the above problem, is to provide a craft activity estimating apparatus, a report generation assistance system, and a craft activity estimating program capable of estimating specific activities of a craft during a navigation.

Solution to Problem

A crew watching apparatus according to a first aspect of the present disclosure includes:

an evaluator to perform an evaluation process to determine whether or not an emergency has occurred for a crew member based on the strength of the notification radio wave received from a crew-worn transmitter that repeatedly transmits the notification radio wave to indicate the presence of the crew member, and the detection result of a ship motion sensor that repeatedly detects the severity of the ship's motion on which the crew member is boarding; and an outputter to output an emergency evaluation signal indicating a result of evaluation, when the evaluator evaluates that the crew is in emergency circumstances.

The evaluator may include a low-intensity period determiner to compare the intensities of the notification radio waves with a threshold radio-wave intensity, and to determine a length of a low-intensity period while the intensities of the notification radio waves are lower than the threshold radio-wave intensity, the threshold radio-wave intensity being preliminarily set as a threshold implying existence of the crew on the craft, an initial locking-motion strength determiner to determine, based on the strengths of the rocking motions detected by the craft rocking-motion sensor, an initial locking-motion strength that indicates a strength of locking motions of the craft at start of the low-intensity period, and an evaluation process executor to execute the evaluation process of evaluating, based on the length of the low-intensity period determined by the low-intensity period determiner and the initial locking-motion strength determined by the initial locking-motion strength determiner, whether the crew is in emergency circumstances.

When the length of the low-intensity period exceeds an allowable length of low-intensity period, the evaluation process executor evaluates that the crew is in emergency circumstances, the allowable length of low-intensity period being set as a threshold implying normal circumstances of the crew, and the evaluator may further include an allowable low-intensity period setter to set the allowable length of low-intensity period to be shorter for a larger initial locking-motion strength determined by the initial locking-motion strength determiner.

The notification radio wave includes a detection result that detects the crew member's movement or biological activity. The evaluator may determine whether or not an emergency has occurred for the crew member based not only on the strength of the notification radio wave and the detection result of the ship motion sensor, but also on the detection result of the crew member's movement or health/physical activity included in the notification radio waves.

The notification radio waves may contain detected values indicating motions of the crew, the evaluator may include a corrector to remove a contribution of the locking motions of the craft to the motions of the crew, from the detected values indicating the motions of the crew, using the detected values indicating the motions of the crew contained in the notification radio waves and the strengths of the rocking motions detected by the craft rocking-motion sensor, and to generate corrected crew data indicating motions of the crew relative to the craft, and the corrected crew data may be used in the evaluation process.

A crew watching program according to a first aspect of the present disclosure is configured to cause a computer to serve as:

an evaluator to perform an evaluation process to determine whether or not an emergency has occurred for a crew member based on the strength of the notification radio wave received from a crew-worn transmitter that repeatedly transmits the notification radio wave to indicate the presence of the crew member, and the detection result of a ship motion sensor that repeatedly detects the severity of the ship's motion on which the crew member is boarding; and an outputter to output an emergency evaluation signal indicating a result of evaluation, when the evaluator evaluates that the crew is in emergency circumstances.

A craft activity estimating apparatus according to a first aspect of the present disclosure includes:

a craft location data acquirer to acquire craft location data containing a chronological series of detected values indicating locations of a craft during a navigation;

an estimator to estimate, based on the craft location data acquired by the craft location data acquirer, specific activities performed during the navigation of the craft; and an outputter to output activity data indicating the specific activities estimated by the estimator.

The vessel activity estimation device according to a first aspect of the present invention further includes:

a crew data acquisition unit that acquires crew data in which detection values representing a movement or a physical activity of a crew member on board the vessel are arranged in chronological order; and the estimation unit may estimate the activity content, using not only the vessel position data, but also the crew data during the navigation period.

The crew data may contain a chronological series of detected values indicating motions of the crew, the craft activity estimating apparatus may further include a craft rocking-motion data acquirer to acquire craft rocking-motion data containing a chronological series of detected values indicating strengths of locking motions of the craft, and a corrector to remove a contribution of the locking motions of the craft to the motions of the crew, from the detected values indicating the motions of the crew, using the crew data and the craft rocking-motion data, and to generate corrected crew data indicating motions of the crew relative to the craft, and the estimator may estimate the specific activities, not only based on the craft location data but also the corrected crew data during the navigation.

The craft activity estimating apparatus according to the first aspect of the present disclosure may further include:

an equipment state data acquirer to acquire equipment state data containing a chronological series of detected values indicating states of operation or usage of fishing and navigation equipment installed in the craft, wherein the estimator may estimate the specific activities, based on not only the craft location data but also the equipment state data during the navigation.

The estimator may be achieved by a trained model generated through machine learning for estimation of the specific activities from the craft location data.

A craft activity estimating program according to a first aspect of the present disclosure is configured to cause a computer to serve as:

a craft location data acquirer to acquire craft location data containing a chronological series of detected values indicating locations of a craft during a navigation;

an estimator to estimate, based on the craft location data acquired by the craft location data acquirer, specific activities performed during the navigation of the craft; and an outputter to output activity data indicating the specific activities estimated by the estimator.

A crew watching apparatus according to a second aspect of the present disclosure includes:

at least one processor, wherein the at least one processor executes an evaluation process of evaluating, based on intensities of notification radio waves indicating existence of a crew on a craft and strengths of rocking motions of the craft detected by a craft rocking-motion sensor, whether the crew is in emergency circumstances, the notification radio waves being received from a wearable transmitting device that repetitively transmits the notification radio waves, the craft rocking-motion sensor repetitively detecting the strengths of the rocking motions, and an outputting process of outputting an emergency evaluation signal indicating a result of evaluation, when the crew is evaluated to be in emergency circumstances in the evaluation process.

The evaluation process may involve a low-intensity period determining process of comparing the intensities of the notification radio waves with a threshold radio-wave intensity, and determining a length of a low-intensity period while the intensities of the notification radio waves are lower than the threshold radio-wave intensity, the threshold radio-wave intensity being preliminarily set as a threshold implying existence of the crew on the craft, an initial locking-motion strength determining process of determining, based on the strengths of the rocking motions detected by the craft rocking-motion sensor, an initial locking-motion strength that indicates a strength of locking motions of the craft at start of the low-intensity period, and an evaluation execution process of evaluating, based on the length of the low-intensity period determined in the low-intensity period determining process and the initial locking-motion strength determined in the initial locking-motion strength determining process, whether the crew is in emergency circumstances.

When the length of the low-intensity period exceeds an allowable length of low-intensity period, the crew is evaluated to be in emergency circumstances in the evaluation execution process, the allowable length of low-intensity period being set as a threshold implying normal circumstances of the crew, and the evaluation process may further involve an allowable low-intensity period setting process of setting the allowable length of low-intensity period to be shorter for a larger initial locking-motion strength determined in the initial locking-motion strength determining process.

The notification radio waves may contain detected values indicating motions or organic activities of the crew, and the at least one processor may evaluate, based on not only the intensities of the notification radio waves and the strengths of the rocking motions detected by the craft rocking-motion sensor but also the detected values indicating the motions or organic activities of the crew contained in the notification radio waves, whether the crew is in emergency circumstances, in the evaluation process.

The notification radio waves may contain detected values indicating motions of the crew, the evaluation process may further involve a correction process of removing a contribution of the locking motions of the craft to the motions of the crew, from the detected values indicating the motions of the crew, using the detected values indicating the motions of the crew contained in the notification radio waves and the strengths of the rocking motions detected by the craft rocking-motion sensor, and generating corrected crew data indicating motions of the crew relative to the craft, and the corrected crew data may be used in evaluation of whether the crew is in emergency circumstances.

A crew watching system according to a first aspect of the present disclosure includes:

the crew monitoring device according to the first or second aspect of the present invention described above;

an alarm device that is installed on the vessel and performs an alarm operation to issue an alarm upon acquisition of the emergency detection signal from the crew monitoring device; and an alarm release device that is installed on the vessel, and when receiving an operation from the crew member to stop the alarm operation when the alarm operation is being performed by the alarm device, causes the alarm device to stop the alarm operation.

The crew watching apparatus may inform a server outside the vessel that the crew is in emergency circumstances, when the alarm operation of the alarm unit continues for a period longer than a confirmation period preliminarily set as a period required by the crew for canceling the alarm operation.

The crew watching system according to the first aspect of the present disclosure may further include:

the wearable transmitting device worn by the crew to transmit the notification radio waves; and the craft rocking-motion sensor installed in the craft to detect the strengths of the locking motions of the craft.

A craft activity estimating apparatus according to a second aspect of the present disclosure includes:

at least one processor, wherein the at least one processor executes a craft-location-data acquiring process of acquiring craft location data containing a chronological series of detected values indicating locations of a craft during a navigation, an estimation process of estimating, based on the craft location data acquired in the craft-location-data acquiring process, specific activities performed during the navigation of the craft, and an outputting process of outputting activity data indicating the specific activities estimated in the estimation process.

The at least one processor may further execute a crew data acquiring process of acquiring crew data containing a chronological series of detected values indicating motions or organic activities of a crew on the craft, and the at least one processor estimates the specific activities, based on not only the craft location data but also the crew data during the navigation, in the estimation process.

The crew data may contain a chronological series of detected values indicating motions of the crew, the at least one processor may further execute a craft rocking-motion data acquiring process of acquiring craft rocking-motion data containing a chronological series of detected values indicating strengths of locking motions of the craft, and a correction process of removing a contribution of the locking motions of the craft to the motions of the crew, from the detected values indicating the motions of the crew, using the crew data and the craft rocking-motion data, and generating corrected crew data indicating motions of the crew relative to the craft, and the at least one processor may estimate the specific activities, not only based on the craft location data but also the corrected crew data during the navigation, in the estimation process.

The at least one processor may further execute an equipment-state data acquiring process of acquiring equipment state data containing a chronological series of detected values indicating states of operation or usage of equipment installed in the craft, and the at least one processor may estimate the specific activities, based on not only the craft location data but also the equipment state data during the navigation, in the estimation process.

The estimation process may be executed using a trained model generated through machine learning for estimation of the specific activities from the craft location data.

A report generation assistance system according to a first aspect of the present disclosure includes:

the craft activity estimating apparatus according to the first aspect or the second aspect of the present disclosure; and a report generating server to acquire the activity data from the craft activity estimating apparatus, and to generate, based on the acquired activity data, report data indicating results of the navigation.

Advantageous Effects of Invention

The crew watching apparatus according to the first and second aspects of the present disclosure, the crew watching system according to the first aspect of the present disclosure, and the crew watching program according to the first aspect of the present disclosure can estimate whether the crew is in emergency circumstances, on the basis of not only the intensities of the notification radio waves but also the strengths of rocking motions of the craft. These configurations can thus properly detect emergency circumstances of the crew.

The craft activity estimating apparatus according to the first and second aspects of the present disclosure, the report generation assistance system according to the first aspect of the present disclosure, and the craft activity estimating program according to the first aspect of the present disclosure can estimate specific activities of the craft during the navigation.

DESCRIPTION OF EMBODIMENTS

Figure 1:
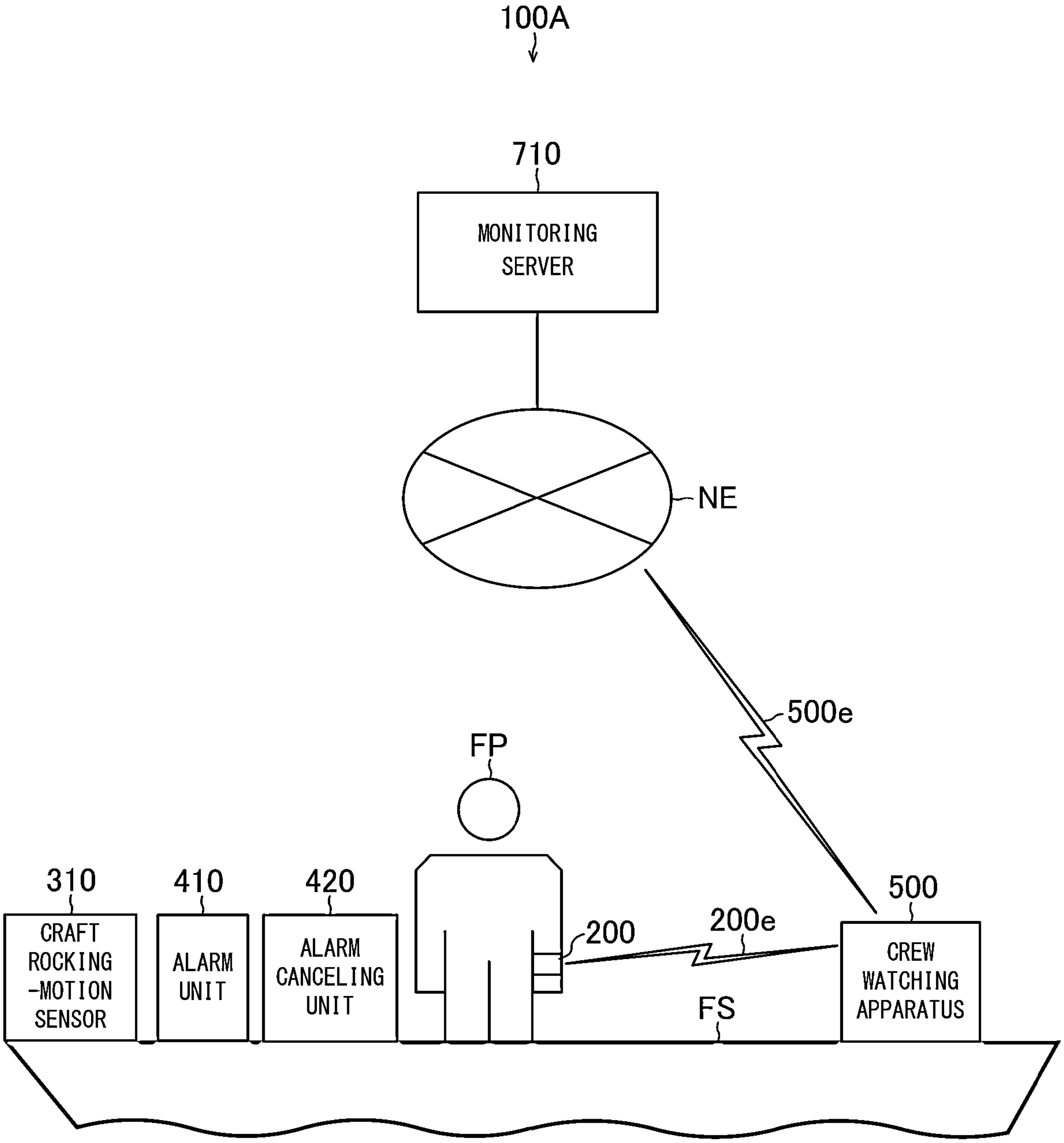
FIG. 1 is a conceptual diagram illustrating a configuration of a crew watching system according to Embodiment 1.

The following describes Embodiments 1 to 3 with reference to the accompanying drawings. In the drawings, the components identical or corresponding to each other are provided with the same reference symbol.

Embodiment 1

As illustrated in FIG. 1, a crew watching system (a seafarer safety system) 100A according to Embodiment 1 includes a crew watching apparatus (a seafarer safety device) 500 installed in a craft FS, and an external monitoring server 710 capable of communication with the crew watching apparatus 500 via a communication line NE. A typical example of the craft FS is a fishing craft.

The crew watching system 100A includes a wearable transmitting device 200 worn by a crew FP on the craft FS, and a craft rocking-motion sensor 310 installed in the craft FS. The wearable transmitting device 200 repetitively transmits notification radio waves 200*e* indicating the existence of the crew FP.

The craft rocking-motion sensor 310 repetitively detects strengths of locking motions of the craft FS, and generates craft rocking-motion data containing a chronological series of detected values indicating the strengths of locking motions of the craft FS. Specifically, the craft rocking-motion sensor 310 includes an acceleration sensor.

The crew watching apparatus 500 receives the notification radio waves 200*e* from the wearable transmitting device 200, and acquires the craft rocking-motion data from the craft rocking-motion sensor 310, so as to execute a crew watching process of determining in real time whether the crew FP is in safety.

The crew watching system 100A also includes an alarm unit 410 and an alarm canceling unit 420 individually installed in the craft FS. The alarm unit 410 performs an alarm operation for issuing an alarm for confirmation of the safety of the crew FP. The alarm canceling unit 420, when receiving a manipulation of the crew FP for stopping the alarm operation during the alarm operation of the alarm unit 410, causes the alarm unit 410 to stop the alarm operation.

The crew watching apparatus 500 causes the alarm unit 410 to initiate the alarm operation, when the safety of the crew FP is not confirmed in the crew watching process. The crew watching apparatus 500 outputs an emergency notification signal 500*e* indicating that the crew FP is in emergency circumstances, wirelessly to the external monitoring server 710, when the alarm operation of the alarm unit 410 is not canceled by the alarm canceling unit 420.

The monitoring server 710, which receives the emergency notification signal 500*e*, executes a rescue requesting process of calling for rescue to the location of the craft FS. The rescue requesting process is directed to other crafts, fisheries cooperative associations, and coast guards during the navigation around the craft FS, or other predetermined places, for example.

As described above, the crew watching system 100A according to the embodiment automatically calls for rescue when the crew FP is in emergency circumstances. The following specifically describes the individual components of the crew watching system 100A.

Figure 2:
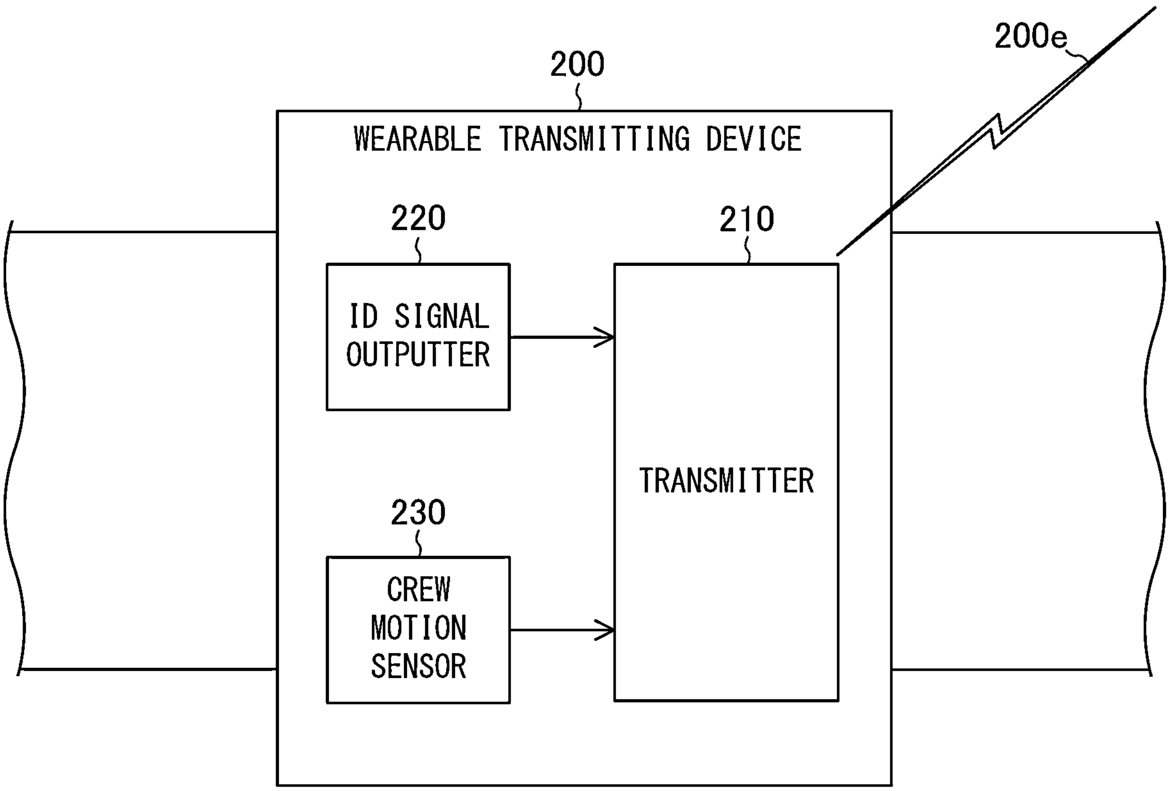
FIG. 2 is a conceptual diagram illustrating a configuration of a wearable transmitting device according to Embodiment 1.

FIG. 2 is a conceptual diagram illustrating a configuration of the wearable transmitting device 200 worn by the crew FP. In the case of multiple crews FP on the craft FS, each of the crews FP wears the wearable transmitting device 200.

The wearable transmitting device 200 includes an ID signal outputter 220 that outputs an ID signal for identifying the crew FP wearing the wearable transmitting device 200, and a crew motion sensor 230 that detects motions of the crew FP. Specifically, the crew motion sensor 230 includes an acceleration sensor.

The wearable transmitting device 200 also includes a transmitter 210 that transmits the above-mentioned notification radio waves 200*e*, containing an ID signal output from the ID signal outputter 220 and a result of detection by the crew motion sensor 230 superimposed on carrier signals. The transmitter 210 transmits the notification radio wave 200*e* at each predetermined repetition period. The repetition period is equal to or longer than 10 milliseconds (ms) and equal to or shorter than 120 seconds(s), for example.

Figure 3:
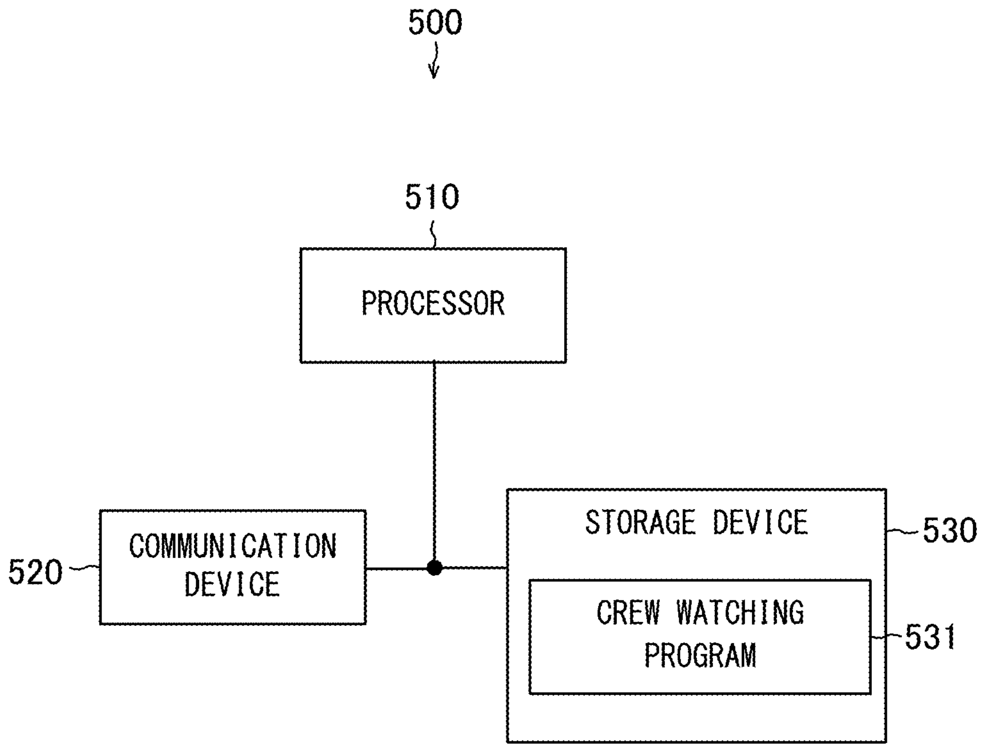
FIG. 3 is a conceptual diagram illustrating a configuration of a crew watching apparatus according to Embodiment 1.

FIG. 3 is a conceptual diagram illustrating a configuration of the crew watching apparatus 500 installed in the craft FS. The crew watching apparatus 500 includes a communication device 520 that receives the above-mentioned notification radio waves 200*e* from the wearable transmitting device 200. The communication device 520 also has a function of receiving the craft rocking-motion data as a result of detection from the craft rocking-motion sensor 310 illustrated in FIG. 1, and a function of outputting the emergency notification signal 500*e* to the monitoring server 710 illustrated in FIG. 1, for example.

The crew watching apparatus 500 also includes a storage device 530 that stores a crew watching program (a seafarer safety program) 531 that defining the steps of the crew watching process of watching the crew FP in real time, and a processor 510 that executes the crew watching program 531. The following describes functions achieved by execution of the crew watching program 531 by the processor 510.

Figure 4:
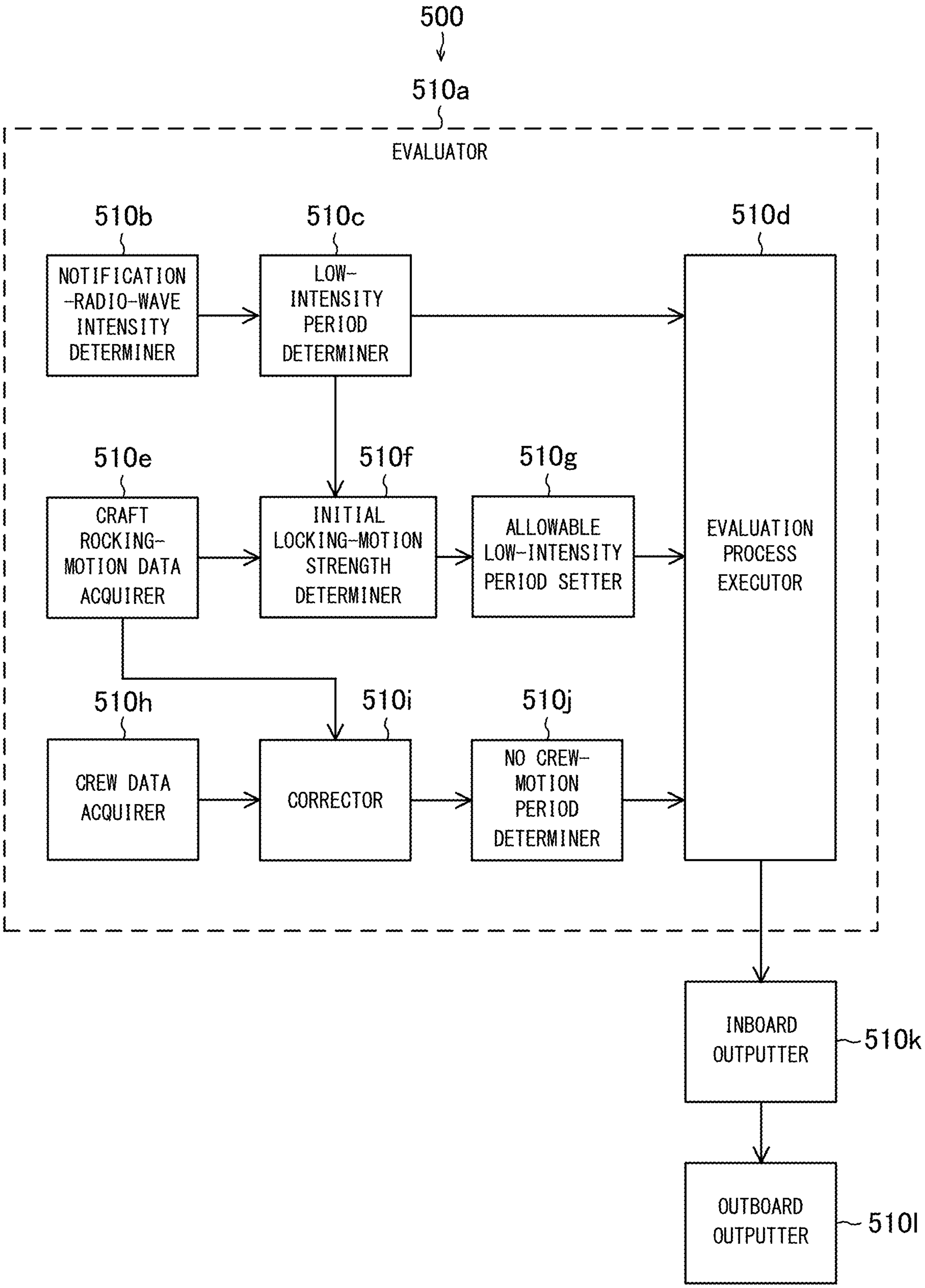
FIG. 4 is a conceptual diagram illustrating functions of the crew watching apparatus according to Embodiment 1.

As illustrated in FIG. 4, the crew watching apparatus 500 includes an evaluator (determination unit) 510*a* that executes an evaluation process of evaluating whether the crew FP is in emergency circumstances.

The evaluator 510*a* includes a notification-radio-wave intensity determiner 510*b* that executes a notification-radio-wave intensity determining process of determining the intensities of the notification radio waves 200*e* (hereinafter referred to as "intensities of the received waves") received by the communication device 520, and a low-intensity period determiner 510*c* that executes a low-intensity period determining process of determining the length of the period (hereinafter referred to as "low-intensity period") while the determined intensities of the received notification radio waves 200*e* are lower than a predetermined threshold radio-wave intensity.

The threshold radio-wave intensity is preliminarily set as a threshold implying the existence of the crew FP on board. For example, in the case of a falling accident of the crew FP into the ocean, the intensities of the received notification radio waves 200*e* fall below the threshold radio-wave intensity, because of a general principle of extremely large attenuation of radio waves in the ocean.

The evaluator 510*a* also includes an evaluation process executor 510*d* that executes an evaluation execution process of determining whether the crew FP is in emergency circumstances on the basis of the length of the low-intensity period determined by the low-intensity period determiner 510*c*. The evaluation process executor 510*d* evaluates that the crew FP is in emergency circumstances, when the length of the low-intensity period exceeds an allowable length of low-intensity period, which is set as a threshold implying the normal circumstances of the crew FP.

The evaluator 510*a* further includes a craft rocking-motion data acquirer 510*e* that executes a craft rocking-motion data acquiring process of acquiring craft rocking-motion data indicating the strengths of locking motions of the craft FS from the craft rocking-motion sensor 310 illustrated in FIG. 1, an initial locking-motion strength determiner 510*f* that executes an initial locking-motion strength determining process of determining the strength of locking motions of the craft FS (hereinafter referred to as "initial locking-motion strength") at the start of the low-intensity period on the basis of the acquired craft rocking-motion data, and an allowable low-intensity period setter 510*g* that executes an allowable low-intensity period setting process of setting the allowable length of low-intensity period in accordance with the initial locking-motion strength.

The allowable low-intensity period setter 510*g* sets the allowable length of low-intensity period to be shorter for a larger initial locking-motion strength. Such a larger initial locking-motion strength means that the low-intensity period is more likely to be caused by a falling accident of the crew FP into the ocean due to strong locking motions of the craft FS. Because of high probability of a falling accident of the crew FP into the ocean, the allowable length of low-intensity period is set to be shorter to increase the detection sensitivity for accurate and rapid detection of such emergency circumstances.

The evaluator 510*a* also includes a crew data acquirer 510*h* that executes a crew data acquiring process of acquiring a result of detection (hereinafter referred to as "crew data") from the crew motion sensor 230 illustrated in FIG. 2 on the basis of the notification radio waves 200*e* received by the communication device 520. The crew data is chronological data containing a chronological series of detected values indicating motions of the crew FP, specifically, detected accelerations.

The evaluator 510*a* further includes a corrector 510*i* that executes a correction process of correcting the crew data acquired by the crew data acquirer 510*h*. The corrector 510*i* corrects the crew data, on the basis of the craft rocking-motion data acquired by the craft rocking-motion data acquirer 510*e*.

The corrector 510*i* corrects the crew data by removing a contribution of the locking motions of the craft FS to the motions of the crew FP, from the detected values indicating motions of the crew FP. Specifically, the corrector 510*i* subtracts, from each of the detected values contained in the crew data, the value contained in the craft rocking-motion data and detected at the same time.

The corrector 510*i* thus generates corrected crew data indicating motions of the crew FP relative to the craft FS. The crew data and the craft rocking-motion data are each chronological data, as described above. The corrected crew data is also chronological data containing a chronological series of values (hereinafter referred to as "relative motion values") indicating motions of the crew FP relative to the craft FS.

The evaluator 510*a* also includes a no crew-motion period determiner 510*j* that executes a no crew-motion period determining process of determining the length of the period (hereinafter referred to as "no crew-motion period") while the crew FP is not moving relative to the craft FS on the basis of the corrected crew data. The "no crew-motion period" indicates a period while the relative motion values contained in the corrected crew data are not necessarily zero but lower than a threshold, which is preliminarily set as a threshold implying substantially no motion of the crew FP.

The evaluation process executor 510*d* evaluates that the crew FP is in emergency circumstances, when the length of the no crew-motion period exceeds an allowable length of no-motion period, which is preliminarily set as a threshold implying the normal circumstances of the crew FP.

The crew watching apparatus 500 includes an inboard outputter 510*k* that executes an inboard outputting process of causing the alarm unit 410 illustrated in FIG. 1 to initiate an alarm operation. The inboard outputter 510*k*, when the evaluation process executor 510*d* evaluates that the crew FP is in emergency circumstances, outputs an emergency evaluation signal indicating the result of evaluation to the alarm unit 410, and thus causes the alarm unit 410 to initiate the alarm operation.

The crew watching apparatus 500 also includes an outboard outputter 510*l* that executes an outboard outputting process of outputting the emergency notification signal 500*e* to the monitoring server 710 illustrated in FIG. 1. The outboard outputter 510*l*, when the alarm operation of the alarm unit 410 is not canceled by the alarm canceling unit

420 within a predetermined confirmation period, outputs the emergency notification signal 500*e* to the monitoring server 710.

Figure 5:
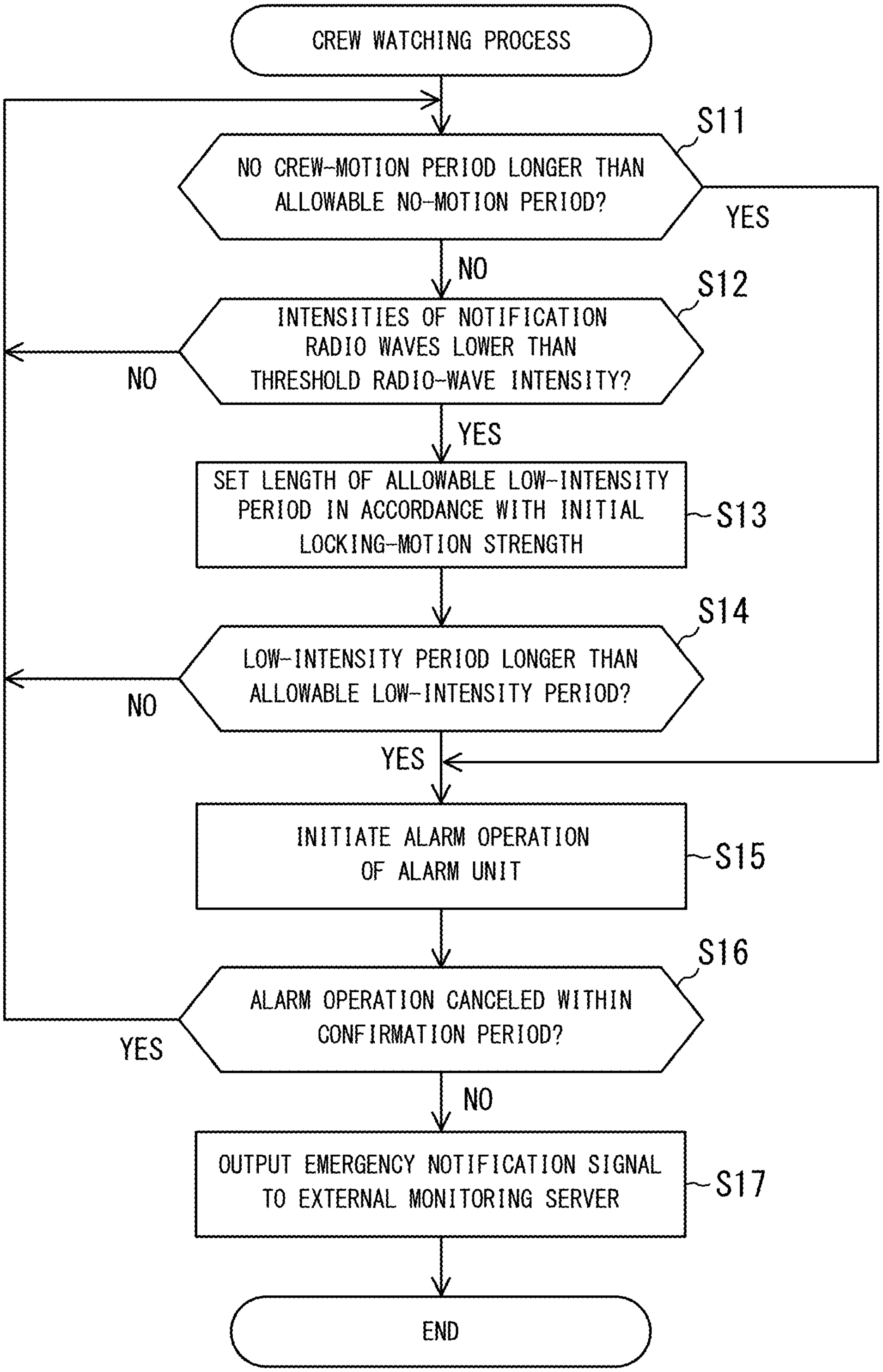
FIG. 5 is a flowchart illustrating a crew watching process according to Embodiment 1.

The following specifically describes the crew watching process achieved by cooperation of the above-described components, with reference to FIG. 5.

As illustrated in FIG. 5, the evaluation process executor 510*d* first evaluates whether the length of the no crew-motion period determined by the no crew-motion period determiner 510*j* exceeds the allowable length of no-motion period, which is preliminarily set as a threshold implying the normal circumstances of the crew FP (Step S11).

When the length of the no crew-motion period exceeds the allowable length of no-motion period (Step S11; YES), the crew FP may be immovable on board due to a heart attack or other emergency circumstances. The evaluation process executor 510*d* in this case evaluates that the crew FP is in emergency circumstances.

In response to this evaluation, the inboard outputter 510*k* outputs an emergency evaluation signal indicating the result of evaluation indicating emergency circumstances of the crew FP, to the alarm unit 410. The alarm unit 410 thus initiates the alarm operation (Step S15).

The outboard outputter 510*l* then determines whether the alarm operation of the alarm unit 410 is canceled within the predetermined confirmation period (Step S16). The crew FP, who is not in emergency circumstances, is able to cancel the alarm operation of the alarm unit 410 by means of the alarm canceling unit 420. When the alarm operation is canceled within the confirmation period (Step S16; YES), which means non-emergency circumstances of the crew FP, then the process returns to Step S11 and continues the real-time watching operation.

In contrast, when the alarm operation is not canceled within the confirmation period (Step S16; NO), the outboard outputter 510*l* outputs the emergency notification signal 500*e* to the external monitoring server 710 to call for rescue (Step S17), followed by termination of this process.

When the length of the no crew-motion period does not exceed the allowable length of no-motion period in Step S11 (Step S11; NO), the initial locking-motion strength determiner 510*f* determines whether the intensity of the received notification radio wave 200*e* determined by the notification-radio-wave intensity determiner 510*b* is lower than the predetermined threshold radio-wave intensity (Step S12).

When the intensity of the received notification radio wave 200*e* is at least the threshold radio-wave intensity (Step S12; NO), which means the existence of the crew FP on board, then the process returns to Step S11 and continues the real-time watching operation.

In contrast, when the intensity of the received notification radio wave 200*e* is lower than the threshold radio-wave intensity (Step S12; YES), the initial locking-motion strength determiner 510*f* determines the initial locking-motion strength, which is the strength of locking motions of the craft FS at that time point when the intensity of the received notification radio wave 200*e* falls below the threshold radio-wave intensity.

A specific example of the initial locking-motion strength when the intensity of the received notification radio wave 200*e* falls below the threshold radio-wave intensity, is the time average of strengths of locking motions of the craft FS during a period around the time point when the intensity of the received notification radio wave 200*e* falls below the threshold radio-wave intensity. This time average is calculated by the initial locking-motion strength determiner 510*f*, on the basis of the craft rocking-motion data.

The allowable low-intensity period setter 510*g* then sets the allowable length of low-intensity period, as a threshold implying the normal circumstances of the crew FP, in accordance with the initial locking-motion strength determined by the initial locking-motion strength determiner 510*f* (Step S13).

The allowable low-intensity period setter 510*g* sets the allowable length of low-intensity period to be shorter for a larger initial locking-motion strength to increase the sensitivity of detecting emergency circumstances, because such a larger initial locking-motion strength means higher probability of a falling accident of the crew FP into the ocean, as described above. In contrast, the allowable low-intensity period setter 510*g* sets the allowable length of low-intensity period to be longer for a smaller initial locking-motion strength to avoid misdetection, because such a smaller initial locking-motion strength means lower possibility of a falling accident of the crew FP into the ocean.

The evaluation process executor 510*d* then evaluates whether the length of the low-intensity period, while the intensities of the received notification radio waves 200*e* are lower than the threshold radio-wave intensity, exceeds the allowable length of low-intensity period set in Step S13 (Step S14).

When the length of the low-intensity period is at most the allowable length of low-intensity period (Step S14; NO), which does not necessarily mean emergency circumstances of the crew FP, then the process returns to Step S11 and continues the real-time watching operation.

In contrast, when the length of the low-intensity period exceeds the allowable length of low-intensity period (Step S14; YES), which means some possibility of a falling accident of the crew FP into the ocean, then the evaluation process executor 510*d* evaluates that the crew FP is in emergency circumstances. In response to this evaluation, the inboard outputter 510*k* outputs the emergency evaluation signal to the alarm unit 410, and the alarm unit 410 initiates the alarm operation (Step S15). Step S16 and the following steps proceed as described above.

As described above with reference to FIG. 2, the notification radio wave 200*e* transmitted from the wearable transmitting device 200 contains the ID signal for identifying the crew FP. In the case of multiple crews FP on the craft FS, the crew watching process illustrated in FIG. 4 is executed for each of the crews FP. The crews FP may share the alarm unit 410 and the alarm canceling unit 420.

Regardless of multiple crews FP on the craft FS, when any of the intensities of the received notification radio waves 200*e* is determined to be zero in Step S12, the crew FP associated with this notification radio wave 200*e* having an intensity of zero can be readily identified on the basis of the preliminarily known ID signals corresponding to all the crews FP on the craft FS.

As described above, the crew watching system 100A according to the embodiment repetitively executes real-time evaluation of whether the crew FP is in emergency circumstances, on the basis of not only the intensities of the received notification radio waves 200*e* but also the strengths of locking motions of the craft FS. The crew watching system 100A can thus properly detect emergency circumstances of the crew FP.

Specifically, the allowable low-intensity period setter 510*g* sets the allowable length of low-intensity period to be shorter for a larger initial locking-motion strength. This process increases the sensitivity of detection of emergency circumstances. The emergency circumstances can therefore be more certainly and rapidly detected without being overlooked, in the case of high probability of a falling accident of the crew FP into the ocean.

The allowable low-intensity period setter 510*g* sets the allowable length of low-intensity period to be longer for a smaller initial locking-motion strength. This process decreases the sensitivity of detection of emergency circumstances, and thus prevents the alarm unit 410 from being unnecessarily activated in the case of low probability of a falling accident of the crew FP into the ocean.

The crew watching system 100A according to the embodiment determines whether the crew FP is in emergency circumstances, on the basis of not only the intensities of the notification radio waves 200*e* and the strengths of locking motions of the craft FS but also the detected values indicating motions of the crew FP.

Specifically, the crew FP is evaluated to be in emergency circumstances, when the length of the no crew-motion period of substantially no motion of the crew FP exceeds the predetermined allowable length of no-motion period. The crew FP can therefore be evaluated to be in emergency circumstances, not only when the crew FP falls into the ocean but also when the crew FP is immovable onboard.

Embodiment 2

FIG. 2 illustrates an exemplary configuration of the wearable transmitting device 200 including the crew motion sensor 230 that detects motions of the crew FP. Alternatively, the wearable transmitting device 200 may include a crew vital sensor that detects organic activities of the crew FP, in place of or in addition to the crew motion sensor 230. The following describes some specific examples thereof.

Figure 6:
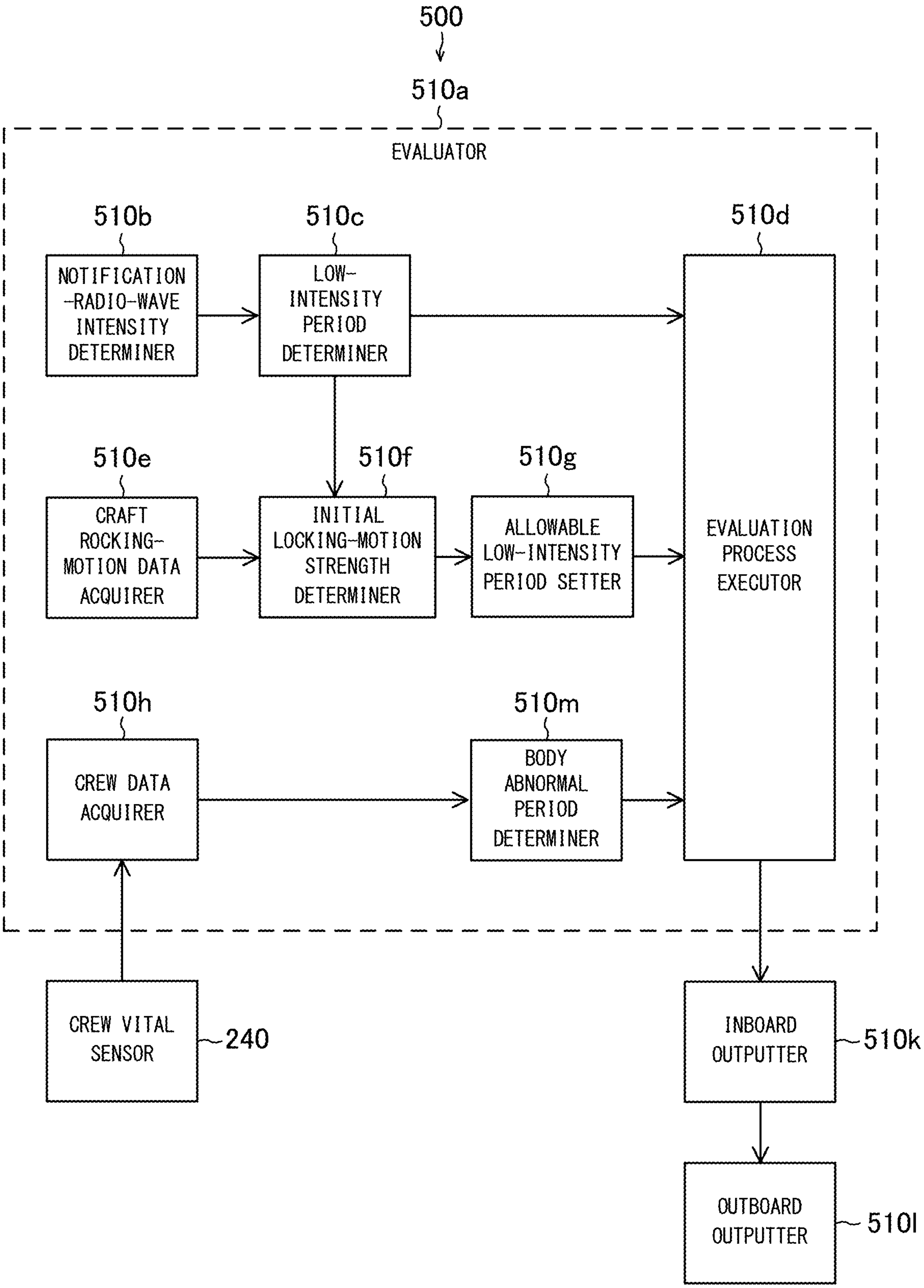
FIG. 6 is a conceptual diagram illustrating functions of a crew watching apparatus according to Embodiment 2.

As illustrated in FIG. 6, the crew data acquirer 510*h* in this embodiment acquires crew data from a crew vital sensor 240 that detects organic activities of the crew FP. The crew data in this embodiment is chronological data containing a chronological series of detected values indicating organic activities of the crew FP, specifically, detected amplitudes of pulse of the crew FP.

The crew vital sensor 240 is included in the wearable transmitting device 200, in place of the crew motion sensor 230 illustrated in FIG. 2. The crew data in this embodiment is also superimposed on the notification radio wave 200*e* and transmitted, as in Embodiment 1. The crew data acquirer 510*h* demodulates the notification radio wave 200*e* and thus acquires the crew data.

The evaluator 510*a* according to the embodiment includes a body abnormal period determiner 510*m* that executes a body-abnormal-period determining process of determining the length of the period (hereinafter referred to as "body abnormal period") while any abnormality occurs in the body of the crew FP, on the basis of the crew data acquired by the crew data acquirer 510*h*. The body abnormal period indicates a period of extraordinarily rapid pulse, a period of extraordinary slow pulse, or a period of extraordinary small amplitude of pulse, for example.

The evaluation process executor 510*d* according to the embodiment compares the length of the body abnormal period determined by the body abnormal period determiner 510*m*, with an allowable length of the body abnormal period, which is preliminarily set as a threshold implying the normal circumstances of the crew FP, in the evaluation step corresponding to Step S11 in FIG. 5. When determining that the length of the body abnormal period exceeds the allowable length of the body abnormal period, the evaluation process executor 510*d* evaluates that any abnormality occurs in the crew FP.

Although the crew vital sensor 240 in the embodiment detects the pulse of the crew FP, this crew vital sensor 240 is a mere example. Another exemplary crew vital sensor 240 may detect the blood oxygen saturation level of the crew FP. The other configurations and effects are identical to those in Embodiment 1.

Embodiment 3

The following describes a report generation assistance system according to an embodiment, focusing on an exemplary craft FS serving as a fishing craft.

Figure 7:
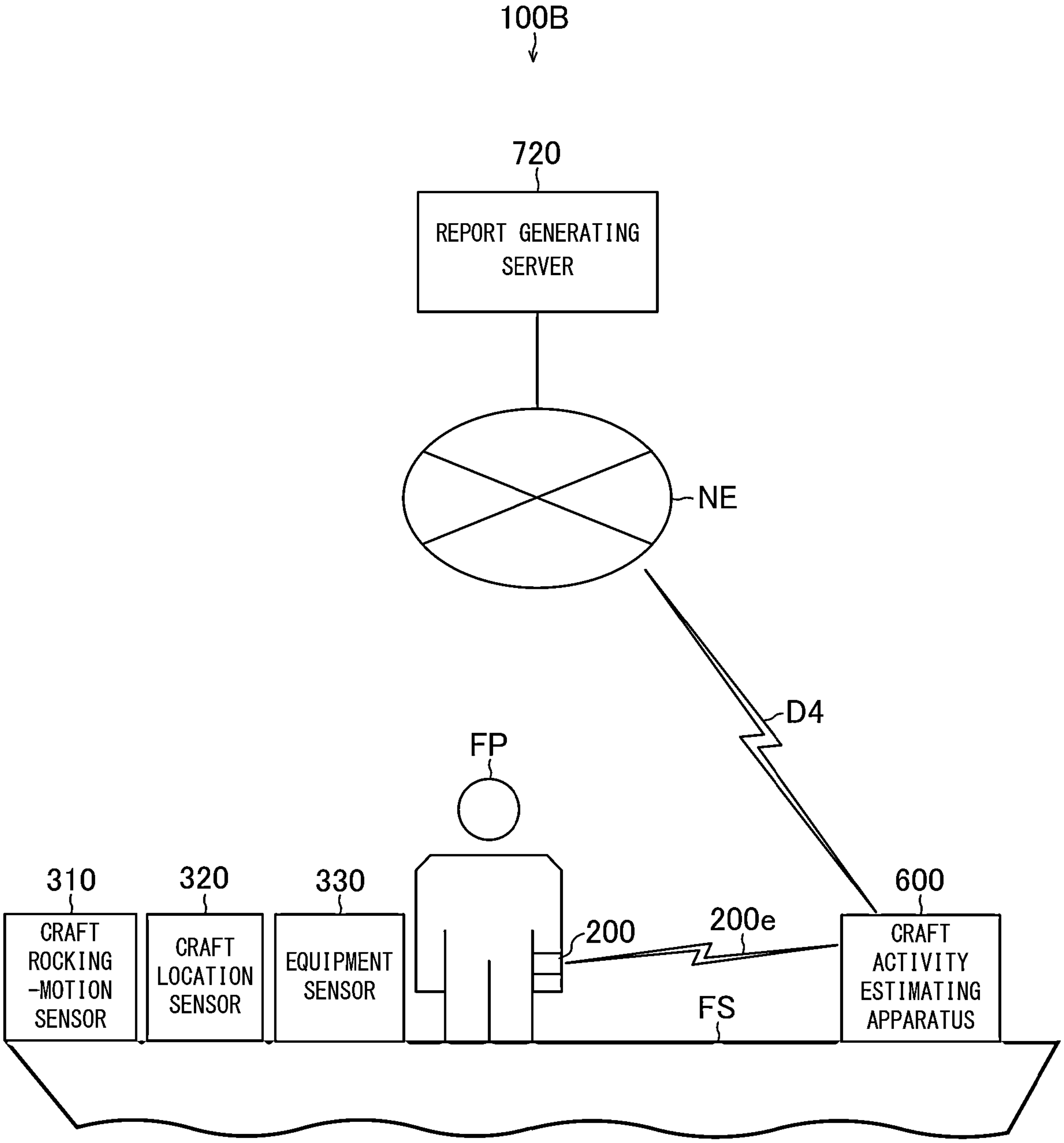
FIG. 7 is a conceptual diagram illustrating a configuration of a report generation assistance system according to Embodiment 3.

As illustrated in FIG. 7, a report generation assistance system (a report generation assistance system) 100B according to the embodiment includes a craft activity estimating apparatus (a vessel activity inference device) 600 installed in the craft FS, and an external report generating server 720 capable of communication with the craft activity estimating apparatus 600 via the communication line NE.

The report generation assistance system 100B also includes a craft location sensor 320 installed in the craft FS. The craft location sensor 320 generates craft location data containing a chronological series of detected values, specifically, coordinate values indicating the locations of the craft FS during a navigation. The craft location sensor 320 includes a global navigation satellite system (GNSS) receiver that detects the locations on the basis of signals from a GNSS satellite, for example.

The report generation assistance system 100B further includes an equipment sensor 330 installed in the craft FS. The equipment sensor 330 generates equipment state data containing a chronological series of detected values indicating the states of operation or usage of the equipment for fishing and navigation, which is not illustrated but installed in the craft FS. The equipment means facilities included in the craft FS, examples of which include engine, capstan for winding a longline, capstan for winding a fishing net, and refrigerator.

In addition, the report generation assistance system 100B also includes the wearable transmitting device 200 worn by the crew FP, and the craft rocking-motion sensor 310 installed in the craft FS. These components and functions are described above in Embodiment 1.

The craft activity estimating apparatus 600 estimates specific activities performed during the navigation of the craft FS, on the basis of the craft location data generated by the craft location sensor 320, the equipment state data generated by the equipment sensor 330, the craft rocking-motion data generated by the craft rocking-motion sensor 310, and the crew data generated by the wearable transmitting device 200.

The craft activity estimating apparatus 600 then outputs activity data D4 indicating a result of estimation of the specific activities, to the report generating server 720, at the timing of establishment of communication with the report generating server 720. The report generating server 720 generates report data indicating achievements of the navigation, on the basis of the activity data D4 acquired from the craft activity estimating apparatus 600.

The report generation assistance system 100B according to the embodiment thus facilitates generation of report data. The following specifically describes a configuration of the craft activity estimating apparatus 600.

Figure 8:
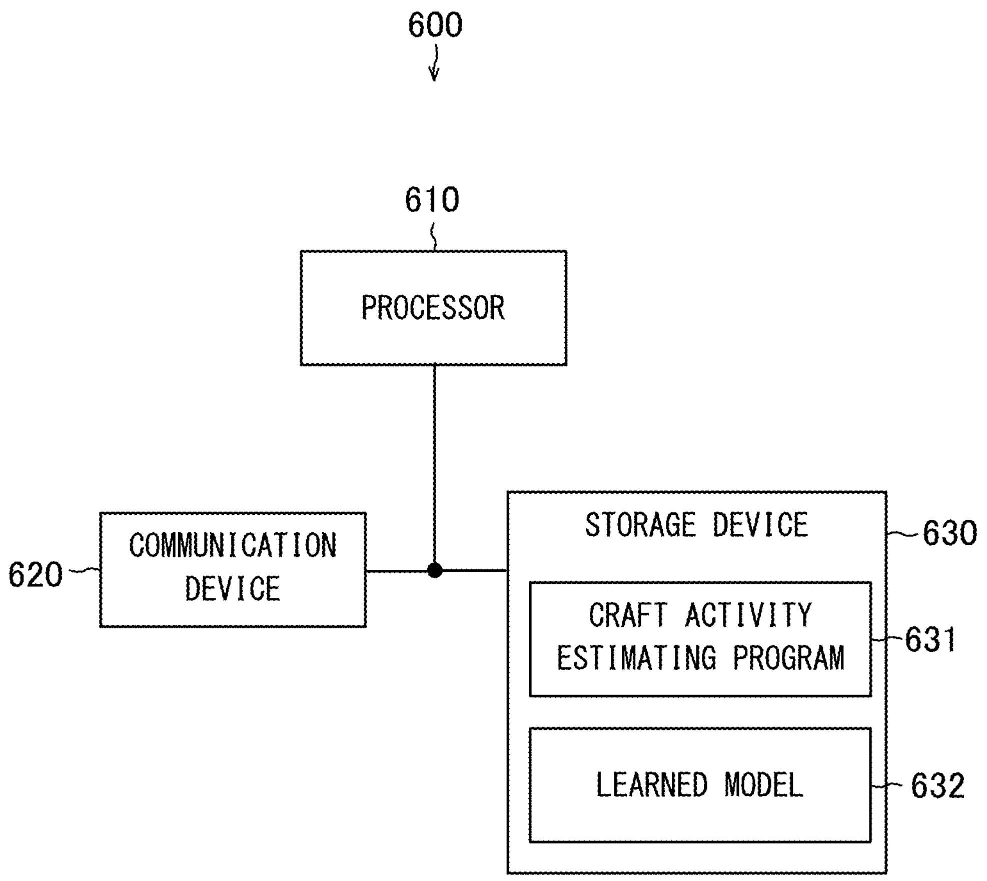
FIG. 8 is a conceptual diagram illustrating a configuration of a craft activity estimating apparatus according to Embodiment 3.

As illustrated in FIG. 8, the craft activity estimating apparatus 600 includes a communication device 620. The communication device 620 performs the function of receiving the craft location data from the craft location sensor 320, the function of receiving the equipment state data from the equipment sensor 330, the function of receiving the craft rocking-motion data from the craft rocking-motion sensor 310, the function of receiving the crew data from the wearable transmitting device 200 by means of the notification radio waves 200*e*, and the function of transmitting the activity data 600*e* to the report generating server 720.

The craft activity estimating apparatus 600 also includes a storage device 630. The storage device 630 stores a craft activity estimating program (a vessel activity inference program) 631 that defines the steps of an estimation process of estimating specific activities performed during the navigation of the craft FS. The storage device 630 also stores a learned model (a trained model) 632 applied to the estimation process.

The craft activity estimating apparatus 600 also includes the processor 610 that executes the craft activity estimating program 631. The following describes functions achieved by execution of the craft activity estimating program 631 by the processor 610.

Figure 9:
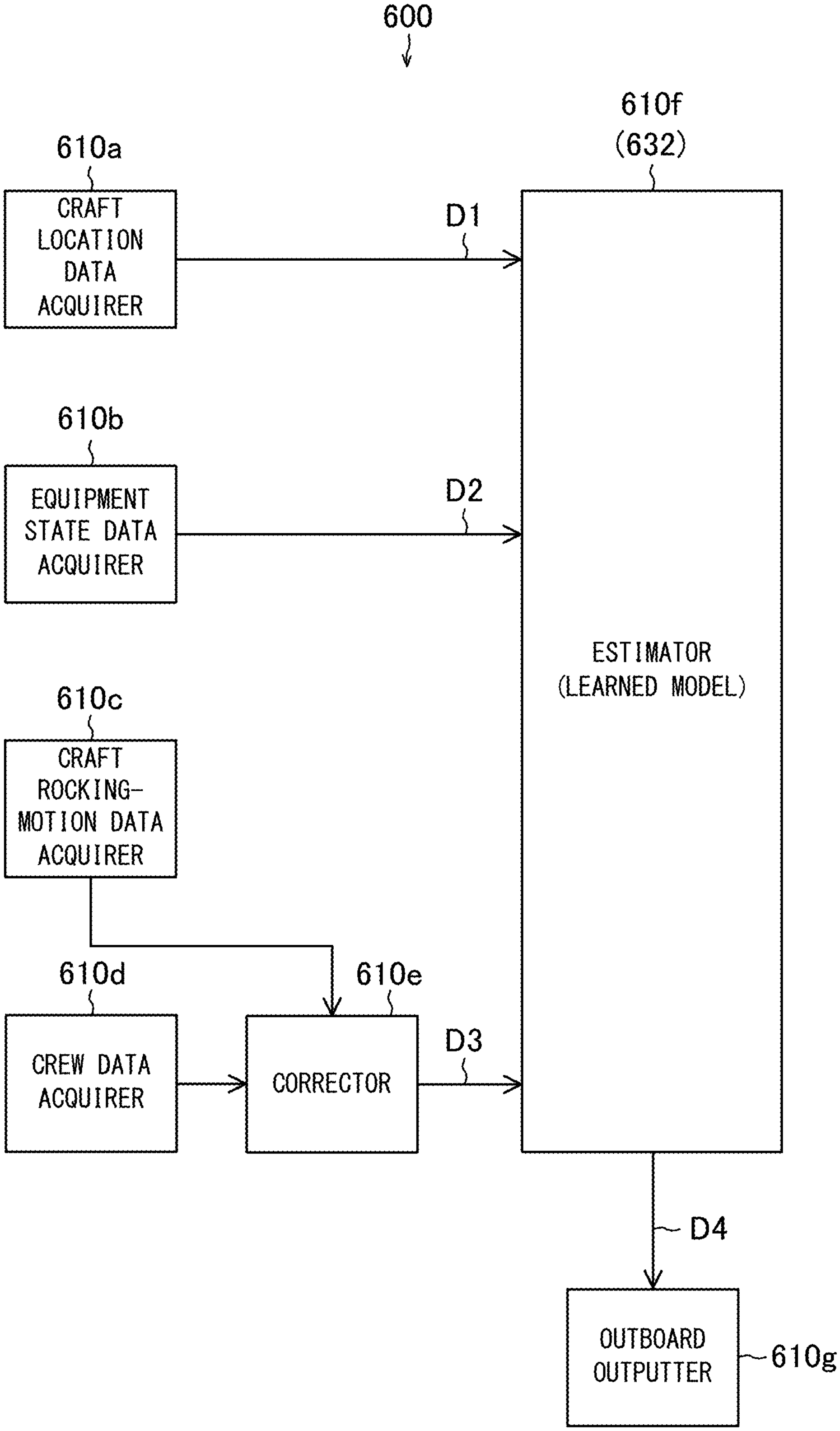
FIG. 9 is a conceptual diagram illustrating functions of the craft activity estimating apparatus according to Embodiment 3.

As illustrated in FIG. 9, the craft activity estimating apparatus 600 includes a craft location data acquirer 610*a* that executes a craft-location-data acquiring process of acquiring craft location data D1 from the craft location sensor 320 via the communication device 620. The craft location data D1 is chronological data containing a chronological series of coordinate values indicating the locations of the craft FS, as described above.

The craft activity estimating apparatus 600 also includes an equipment state data acquirer 610*b* that executes an equipment-state data acquiring process of acquiring equipment state data D2 from the equipment sensor 330 via the communication device 620. The equipment state data D2 is chronological data containing a chronological series of detected values indicating the states of operation or usage of the equipment, examples of which include engine, capstan for winding a longline, capstan for winding a fishing net, and refrigerator, as described above.

The craft activity estimating apparatus 600 further includes a craft rocking-motion data acquirer 610*c* that executes a craft rocking-motion data acquiring process of acquiring the craft rocking-motion data from the craft rocking-motion sensor 310 via the communication device 620. The craft rocking-motion data is chronological data containing a chronological series of detected strengths of locking motions of the craft FS, specifically, detected accelerations, as described above.

The craft activity estimating apparatus 600 also includes a crew data acquirer 610*d* that executes a crew data acquiring process of acquiring the crew data on the basis of the notification radio waves 200*e* received by the communication device 620. The crew data is chronological data containing a chronological series of detected values indicating motions of the crew FP, specifically, detected accelerations, as described above.

The craft activity estimating apparatus 600 further includes a corrector 610*e* that executes a correction process of correcting the crew data acquired by the crew data acquirer 610*d*. The corrector 610*e* corrects the crew data by removing a contribution of the locking motions of the craft FS to the motions of the crew FP from the detected values indicating motions of the crew FP, on the basis of the crew data acquired by the crew data acquirer 610*d* and the craft rocking-motion data acquired by the craft rocking-motion data acquirer 610*c*.

The corrector 610*e* thus generates corrected crew data D3. The corrected crew data D3 is chronological data containing a chronological series of relative motion values indicating motions of the crew FP relative to the craft FS.

The craft activity estimating apparatus 600 also includes an estimator 610*f* that executes an estimation process of estimating specific activities (hereinafter referred to as "activities of the craft FS") performed during the navigation of the craft FS on the basis of the craft location data D1, the equipment state data D2, and the corrected crew data D3. The functions of the estimator 610*f* are achieved by the learned model 632 illustrated in FIG. 8.

Specific examples of the "activities of the craft FS" include departure, travel toward a fishery, search for a fishery, fishing, offshore stay, and arrival, in the case of the craft FS serving as a fishing craft.

The "fishing" in this case also contains information on specific types of caught aquatic products. That is, the estimator 610*f* can estimate not only that fishing was performed as an activity of the craft FS but also what types of aquatic products were caught in the fishing.

The activity data D4 has a data structure containing the above-mentioned specific activities of the craft FS associated with the times of the respective activities. The activity data D4 can contribute to specification of the types and times of activities of the craft FS from the departure until the arrival.

The craft location data D1, the equipment state data D2, and the corrected crew data D3 are correlated with the activities of the craft FS. The activities of the craft FS can thus be estimated from the craft location data D1, the equipment state data D2, and the corrected crew data D3 in principle.

The following describes an exemplary correlation between the activities of the craft FS and the craft location data D1, the equipment state data D2, and the corrected crew data D3, focusing on exemplary activities of the craft FS involving "fishing".

Figure 10:
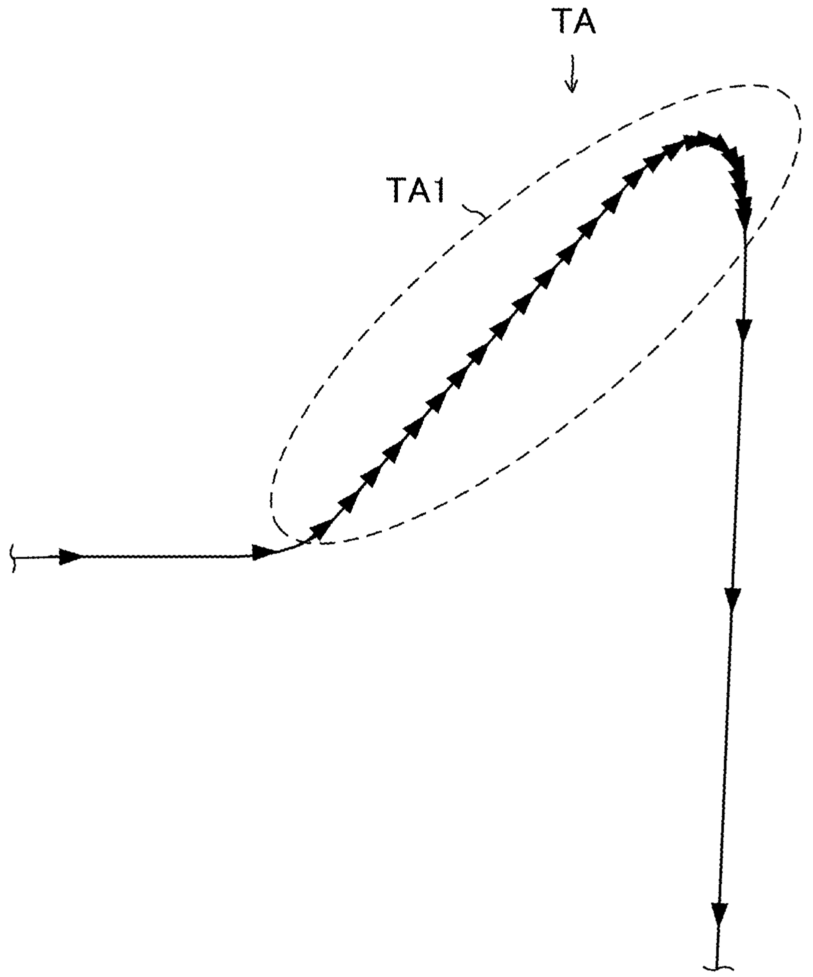
FIG. 10 is a conceptual diagram illustrating a trajectory specified by craft location data according to Embodiment 3.

FIG. 10 is a conceptual diagram illustrating a trajectory TA of the craft FS indicated by the craft location data D1. The craft location data D1 is chronological data containing a chronological series of coordinate values indicating the locations of the craft FS, as described above. The trajectory TA is defined by plotting the coordinate values contained in the craft location data D1 on a two-dimensional coordinate plane, and connecting the adjacent plots to each other with line segments.

The trajectory TA is provided with arrows representing traveling directions of the craft FS with the same time interval, in order to clarify the velocity of the craft FS. A shorter interval between arrows means a lower velocity of the craft FS.

The trajectory TA contains some segments TA1 (hereinafter referred to as "extremely slow segments") in which the craft FS travels extremely slowly while being drifted. Such extremely slow segments TA1 are characteristic in drift squid fishing.

The craft FS in the squid fishing is not actively traveling. The engine included in the equipment of the craft FS is stopped or idling, as is indicated by the equipment state data D2 in the period of the navigation of the extremely slow segments TA1.

The crew FP in the squid fishing has relatively large motions at random on the craft FS. Such characteristic motions are indicated by the corrected crew data D3 in the period of the navigation of the extremely slow segments TA1.

Figure 11:
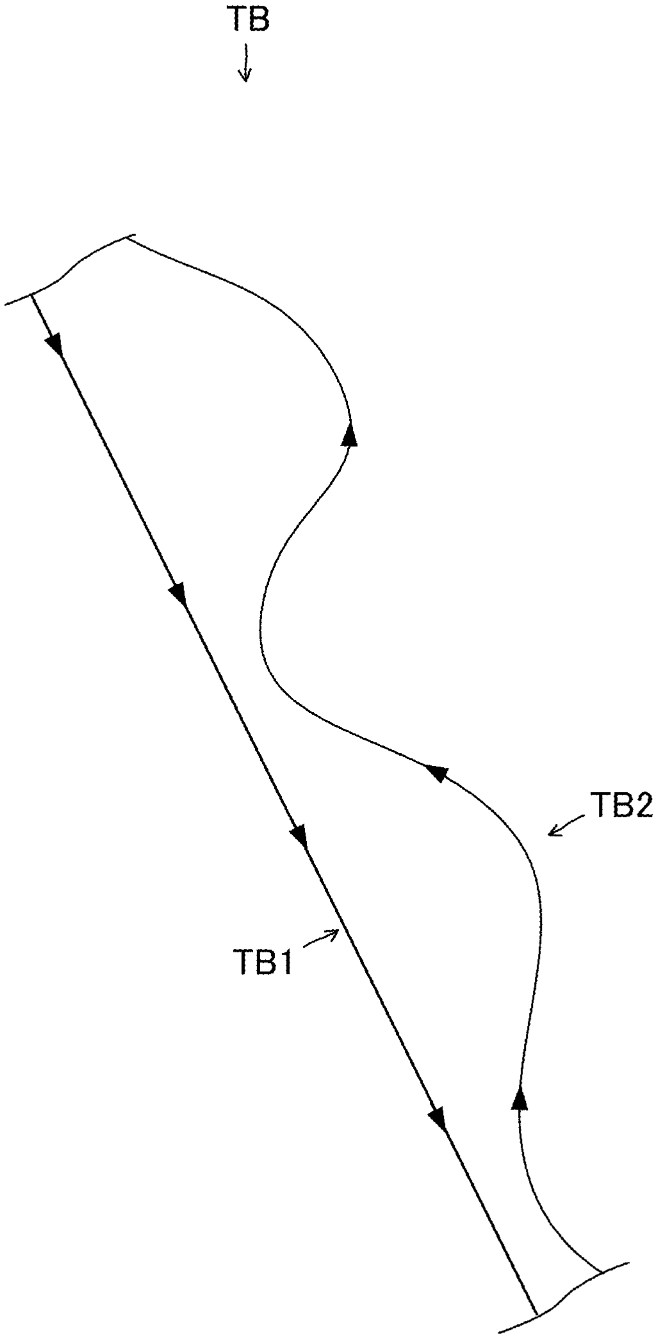
FIG. 11 is a conceptual diagram illustrating another trajectory specified by the craft location data according to Embodiment 3.

FIG. 11 is a conceptual diagram illustrating another trajectory TB of the craft FS indicated by the craft location data D1. The trajectory TB in this example contains a combination of outward segments TB1 representing a linear travel, and return segments TB2 representing a tortuous return travel along the outward segments TB1.

Such a combination of the outward segments TB1 and the return segments TB2 are characteristic in longline fishery for adult yellowtails. Specifically, the outward segments TB1 correspond to development of a longline, and the return segments TB2 correspond to collection of the longline.

The equipment state data D2 in the period of the navigation of the outward segments TB1 indicates that the capstan for the longline included in the equipment is unwinding the longline. In contrast, the equipment state data D2 in the period of the navigation of the return segments TB2 indicates that the capstan for the longline is winding the longline.

The corrected crew data D3 in the period of the navigation of the return segments TB2 indicates periodic motions of the crew FP for repetitively releasing adult yellowtails from longline hooks. In contrast, the corrected crew data D3 in the period of the navigation of the outward segments TB1 indicates smaller motions of the crew FP than those in the period of the navigation of the return segments TB2.

The craft location data D1, the equipment state data D2, and the corrected crew data D3 are correlated with the activities of the craft FS, as described above. Although FIGS. 10 and 11 illustrate exemplary activities of the craft FS involving "fishing", persons skilled in the art will recognize that other activities, such as departure, travel toward a fishery, search for a fishery, offshore stay, and arrival, can also be estimated from the craft location data D1, the equipment state data D2, and the corrected crew data D3.

The above-described correlation can be used to achieve the functions of the estimator 610*f* illustrated in FIG. 9. The functions of the estimator 610*f* in this embodiment can be achieved by means of the learned model 632 illustrated in FIG. 8, as described above.

The learned model 632 illustrated in FIG. 8 is generated by machine learning for estimating activities of the craft FS at each time point, on the basis of the craft location data D1, the equipment state data D2, and the corrected crew data D3.

The following describes a learned model generating device for generating the learned model 632.

Figure 12:
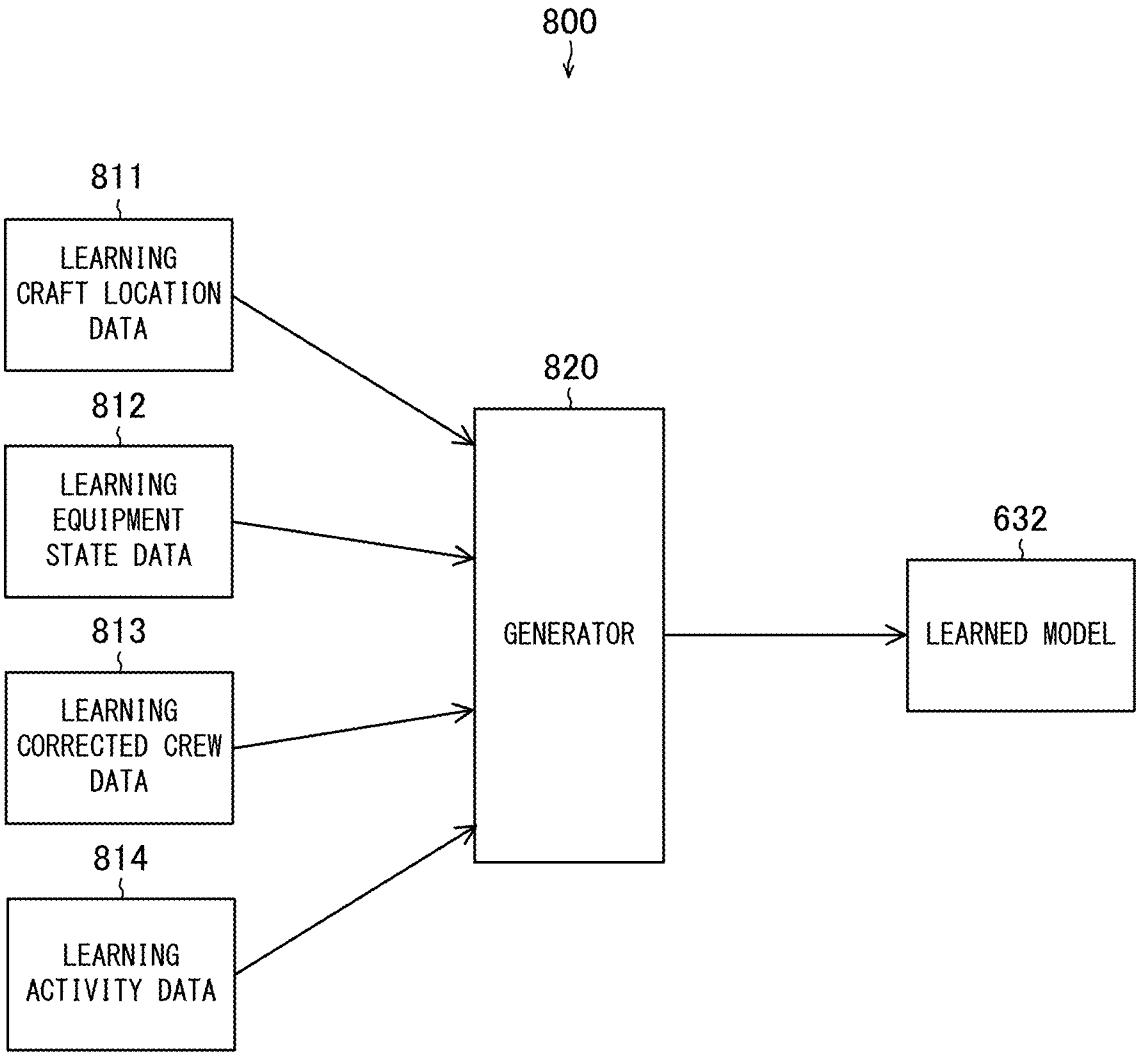
FIG. 12 is a conceptual diagram illustrating a configuration of a learned model generating device according to Embodiment 3.

As illustrated in FIG. 12, the learned model generating device 800 is provided with combinations of learning craft location data 811, learning equipment state data 812, learning corrected crew data 813, and learning activity data 814, which are prepared in advance.

The learning craft location data 811 is supervision data corresponding to the craft location data D1 illustrated in FIG. 9, and may be measured sample values of the craft location data D1. The learning equipment state data 812 is supervision data corresponding to the equipment state data D2 illustrated in FIG. 9, and may be measured sample values of the equipment state data D2. The learning corrected crew data 813 is supervision data corresponding to the corrected crew data D3 illustrated in FIG. 9, and may be measured sample values of the corrected crew data D3.

The learning activity data 814 is supervision data corresponding to the activity data D4 illustrated in FIG. 9. The learning activity data 814 indicates the actual activities of the craft FS exactly identified at each time point, on the basis of the provided learning craft location data 811, learning equipment state data 812, and learning corrected crew data 813. The learning activity data 814 is manually generated, for example.

The learned model generating device 800 includes a generator 820 that generates the learned model 632, on the basis of the learning craft location data 811, the learning equipment state data 812, the learning corrected crew data 813, and the learning activity data 814.

The generator 820 learns a policy for estimating the learning activity data 814 from the learning craft location data 811, the learning equipment state data 812, and the learning corrected crew data 813. This machine learning generates the learned model 632.

The description refers back to FIG. 9. The learned model 632 generated as described above achieves the estimator 610*f*. The estimator 610*f* receives input of the craft location data D1, the equipment state data D2, and the corrected crew data D3.

The learned model 632 serving as the estimator 610*f* outputs the activity data D4, as a result of estimation of activities of the craft FS. The activity data D4 indicates estimated types and times of activities of the craft FS from the departure until the arrival.

The craft activity estimating apparatus 600 also includes an outboard outputter 610*g* that acquires the activity data D4 from the learned model 632 serving as the estimator 610*f*. The outboard outputter 610*g* outputs the acquired activity data D4 to the report generating server 720 illustrated in FIG. 7. The report generating server 720 generates report data on the basis of the activity data D4.

As described above, the craft activity estimating apparatus 600 according to the embodiment is able to estimate activities of the craft FS on the basis of the craft location data D1. Specifically, the craft activity estimating apparatus 600 automatically generates the activity data D4 indicating estimated activities of the craft FS. The generated activity data D4 is used for generation of a report that demonstrates achievements of the navigation. The craft activity estimating apparatus 600 can further reduce the tasks for generation of a report than existing apparatuses.

The estimation of activities of the craft FS uses, not only the craft location data D1, but also the equipment state data D2 during the navigation and the crew data indicating motions of the crew FP during the navigation. This estimation can achieve higher accuracy than the estimation using only the craft location data D1.

The crew data is corrected on the basis of the craft rocking-motion data indicating the strengths of locking motions of the craft FS, and then used for estimation of activities of the craft FS. Specifically, the crew data is corrected by removing a contribution of the locking motions of the craft FS, and thus provides the corrected crew data D3 indicating relative motions of the crew FP relative to the craft FS. This corrected crew data D3 is used for estimation of activities of the craft FS. The estimation of activities of the craft FS using the corrected crew data D3 can reveal more accurate motions of the crew FP, and thus achieve higher accuracy, than the estimation using crew data before correction.

Embodiment 4

In Embodiment 3 described above, the wearable transmitting device 200 may include a crew vital sensor that detects organic activities of the crew FP in place of or in addition to the crew motion sensor 230, as in Embodiment 2. The following describes some specific examples of this embodiment.

Figure 13:
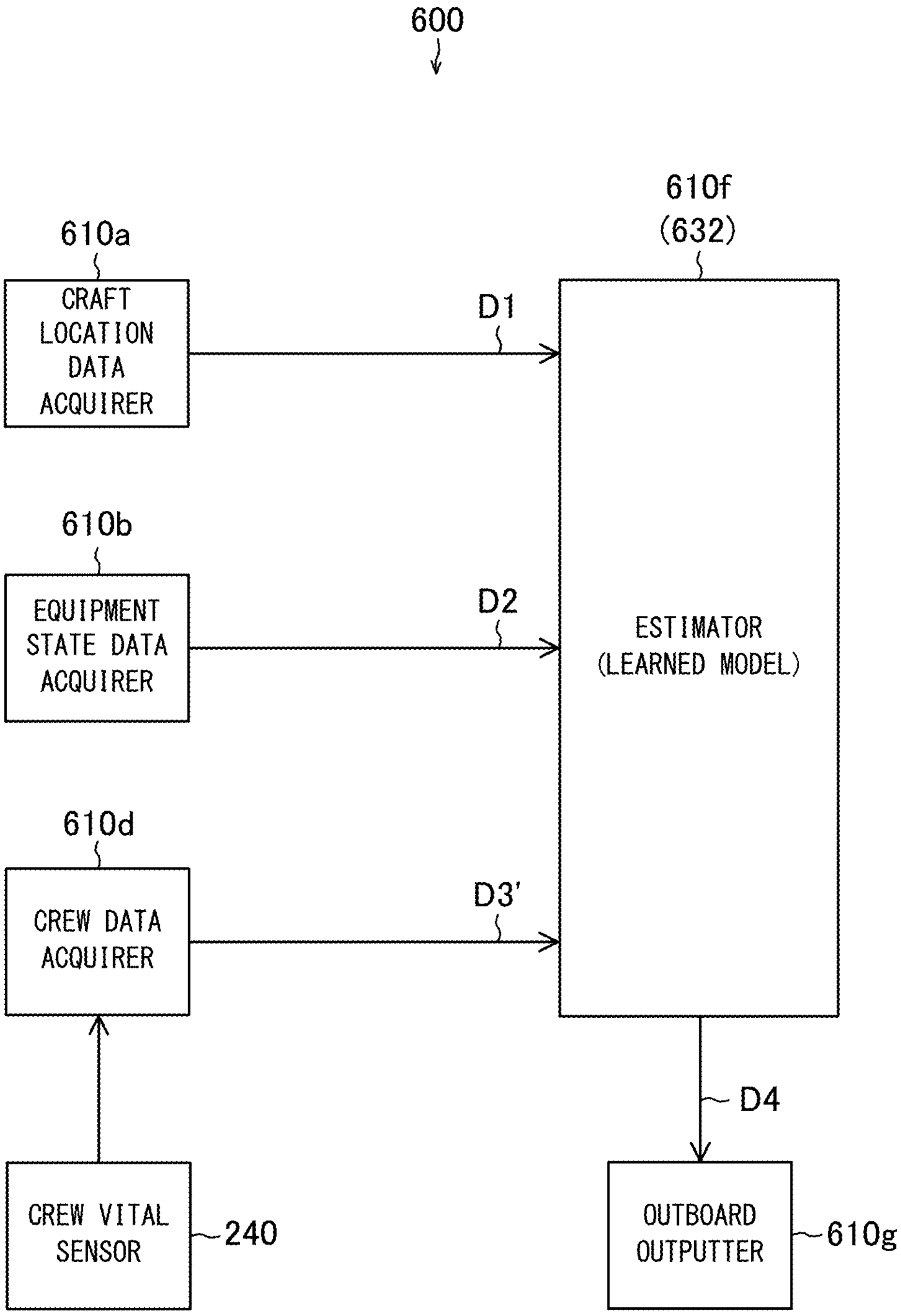
FIG. 13 is a conceptual diagram illustrating functions of a craft activity estimating apparatus according to Embodiment 4.

As illustrated in FIG. 13, the crew data acquirer 610*d* in the embodiment acquires the crew data from the crew vital sensor 240 that detects organic activities of the crew FP. The crew data D3' in the embodiment is chronological data containing a chronological series of detected values indicating organic activities of the crew FP, specifically, detected amplitudes of pulse of the crew FP.

The estimator 610*f* in the embodiment estimates activities of the craft FS, on the basis of the craft location data D1, the equipment state data D2, and the crew data D3'.

The crew data D3', which indicates a chronological series of detected values indicating organic activities of the crew FP, also reflects the strengths of motions of the crew FP relative to the craft FS, like the corrected crew data D3 described above. Persons skilled in the art will thus recognize that this crew data D3' can be used for estimation of activities of the craft FS in place of or in addition to the corrected crew data D3.

Although the crew vital sensor 240 in the embodiment detects the pulse of the crew FP, this crew vital sensor 240 is a mere example. Another exemplary crew vital sensor 240 may detect the blood oxygen saturation level of the crew FP. The other configurations and effects are identical to those in Embodiment 3.

Embodiment 5

In Embodiments 3 and 4 described above, the estimator 610*f* estimates activities of the craft FS. The estimator 610*f* in the embodiment estimates, in addition to the activities of the craft FS, an amount of fish catch and an amount of fuel consumption.

As described above with reference to FIGS. 10 and 11, the craft location data D1 reveals the period of fishing of the craft FS. As the crew FP on the craft FS has larger motions in the period, the craft FS is expected to achieve a larger amount of fish catch. These motions of the crew FP are indicated by the corrected crew data D3 or the crew data D3'. The amount of fish catch is also reflected by the states of usage of the refrigerator and other equipment. These states of usage of equipment are indicated by the equipment state data D2.

The amount of fish catch is reflected by the craft location data D1, the equipment state data D2, and the corrected crew data D3 or the crew data D3', as described above. Persons skilled in the art will thus recognize that the amount of fish catch can be estimated from these types of data in principle.

As described above with reference to FIGS. 10 and 11, the craft location data D1 reveals the time variation of velocity of the craft FS. As described above with reference to FIG. 10, the craft location data D1 reveals the state of the engine of the craft FS, specifically, a stop state, idling state, or active state of generating a thrust force. Persons skilled in the art will thus recognize that the amount of fuel consumption can be estimated using the craft location data D1 in principle.

The Embodiments 1 to 5 described above may be modified as described below.

(1) In Embodiment 3, the estimator 610*f* estimates activities of the craft FS, from the craft location data D1, the equipment state data D2, and the corrected crew data D3. Alternatively, the estimator 610*f* may estimate activities of the craft FS from the craft location data D1 alone, from the craft location data D1 and the equipment state data D2 alone, from the craft location data D1 and the corrected crew data D3 alone, or from the craft location data D1 and the crew data D3' alone.

(2) Embodiment 3 illustrates the learned model 632 generated by a supervised learning algorithm. Alternatively, the learned model 632 may be generated by a learning algorithm, such as an unsupervised learning algorithm, other than the supervised learning algorithm. The unsupervised leaning does not require results or the learning activity data 814, which is illustrated in FIG. 12. The generator 820 is preliminarily provided with the definition of distance between data points, learns characteristics of the learning craft location data 811, the learning equipment state data 812, and the learning corrected crew data 813 through clustering techniques, and thus generates the learned model 632.

(3) The craft activity estimating apparatus 600 according to Embodiment 3 may also include an updater that updates the learned model 632 through reinforcement learning. In this case, the crew FP may check for the report data generated by the report generating server 720 later, and provide the report data with a reward indicating the accuracy of the report data. The data indicating the reward is fed back to the updater. The updater then updates the policy for estimating activities in the learned model 632, using the conditions that can achieve the largest reward.

(4) Embodiments 3 to 5 illustrate the learned model 632 used for estimation of activities of the craft FS. Alternatively, the activities of the craft FS may be estimated by a procedure other than the artificial intelligence. For example, the estimator 610*f* may analyze the craft location data D1, the equipment state data D2, and the corrected crew data D3 or the crew data D3', extracts patterns that identify the activities of the craft FS from the data through pattern recognition, and thus estimate activities of the craft FS.

(5) Embodiment 3 illustrates the craft location data D1 detected by the craft location sensor 320. The craft location data D1 is only required to indicate a chronological series of values indicating the locations of the craft, and may be generated by any procedure. For example, the craft location data D1 may be generated through satellite remote sensing, or by means of a craft radar or an automatic identification system (AIS).

(6) Although FIG. 2 illustrates the crew motion sensor 230 included in the wearable transmitting device 200, the wearable transmitting device 200 does not necessarily include the crew motion sensor 230. The crew data, containing a chronological series of detected values indicating motions of the crew FP, is not necessarily generated by the crew motion sensor 230 serving as an acceleration sensor. The crew data may also be generated by a non-contact procedure for detecting motions of the crew FP, for example, by irradiating the crew FP with radio waves, ultrasonic waves, or infrared rays, or by capturing images of the crew FP.

(7) Although Embodiments 3 to 5 illustrate the craft FS serving as a fishing craft, the craft FS is not necessarily a fishing craft. In an exemplary case of a craft FS serving as a patrol vessel, the estimator 610*f* estimates activities of the craft FS serving as a patrol vessel, example of which include patrol, crackdown, rescue, and departure.

(8) The configuration according to Embodiment 1 or 2 may be combined with the configuration according to any one of Embodiments 3 to 5. Specifically, the monitoring server 710 illustrated in FIG. 1 may also have the functions of the report generating server 720 illustrated in FIG. 7. The crew watching apparatus 500 illustrated in FIG. 1 may also have the functions of the activity estimating apparatus 6100 illustrated in FIG. 7. The craft FS illustrated in FIG. 1 may be further provided with the craft location sensor 320 and the equipment sensor 330 illustrated in FIG. 7.

(9) The crew watching program 531 illustrated in FIG. 2 may be installed in a computer, such as existing smartphone or tablet, and thus cause the computer to serve as the crew watching apparatus 500. The crew watching program 531 may be distributed via a communication line, or stored in a non-transitory computer-readable recording medium and then distributed.

(10) The craft activity estimating program 631 and the learned model 632 illustrated in FIG. 8 may be installed in a computer, such as existing smartphone or tablet, and thus cause the computer to serve as the craft activity estimating apparatus 600. The craft activity estimating program 631 and the learned model 632 may be distributed via a communication line, or stored in a non-transitory computer-readable recording medium and then distributed.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2022-119000, filed on Jul. 26, 2022, the entire disclosure of which is incorporated by reference herein.

REFERENCE SIGNS LIST

100A Crew watching system
100B Report generation assistance system
200 Wearable transmitting device
200*e* Notification radio wave
210 Transmitter
220 ID signal outputter
230 Crew motion sensor
240 Crew vital sensor
310 Craft rocking-motion sensor
320 Craft location sensor
330 Equipment sensor
410 Alarm unit
420 Alarm canceling unit
500 Crew watching apparatus
500*e* Emergency notification signal
510 Processor
510*a* Evaluator
510*b* Notification-radio-wave intensity determiner
510*c* Low-intensity period determiner
510*d* Evaluation process executor
510*e* Craft rocking-motion data acquirer
510*f* Initial locking-motion strength determiner
510*g* Allowable low-intensity period setter
510*h* Crew data acquirer
510*i* Corrector
510*j* No crew-motion period determiner
510*k* Inboard outputter (outputter)
510*l* Outboard outputter
510*m* Body abnormal period determiner
520 Communication device
530 Storage device
531 Crew watching program
600 Craft activity estimating apparatus
610 Processor
610*a* Craft location data acquirer
610*b* Equipment state data acquirer
610*c* Craft rocking-motion data acquirer
610*d* Crew data acquirer
610*e* Corrector
610*f* Estimator
610*g* Outboard outputter (outputter)
620 Communication device
630 Storage device
631 Craft activity estimating program
632 Learned model
710 Monitoring server
720 Report generating server
800 Learned model generating device
811 Learning craft location data
812 Learning equipment state data
813 Learning corrected crew data
814 Learning activity data
820 Generator
D1 Craft location data
D2 Equipment state data
D3 Corrected crew data
D3' Crew data
D4 Activity data
FS Craft
FP Crew
NE Communication line
TA, TB Trajectory
TA1 Extremely slow segment
TB1 Outward segment
TB2 Return segment

The invention claimed is:

1. A vessel activity inference device, comprising:
at least one processor, wherein
the at least one processor executes
a craft-location-data acquiring process of acquiring craft location data containing a chronological series of detected values indicating locations of a craft during a navigation,
a specifying process of specifying, based on the craft location data acquired in the craft-location-data acquiring process, activities performed by the craft, and
an outputting process of outputting activity data indicating the activities specified in the specifying process,
in the specifying process, the at least one processor has a function of specifying, based on the craft location data, each of (a) travel toward a search region in which search for a fishery is performed, (b) the search for the fishery in the search region, (c) fishing in the fishery searched, (d) offshore stay, and (e) travel to return to a port after the fishing, as the activities, and specifies the activities multiple times based on the craft location data from departure until arrival of the craft to specify the activities of different types performed during the period from the departure until the arrival of the craft, and
the activity data indicates the activities of different types performed during the period from the departure until the arrival of the craft, and a time at which each activity is performed.

2. The vessel activity inference device according to claim 1, wherein in the specifying process, the at least one processor has a function of specifying, based on the craft location data, that longline fishery is performed as the fishing, and, when the fishing is specified as the longline fishery based on the activities, specifies, based on the craft location data, an outward period during which a longline is developed in the longline fishery, and a return period during which the longline is collected in the longline fishery.

3. The vessel activity inference device according to claim 1, wherein the at least one processor further executes a crew data acquiring process of acquiring crew data containing a chronological series of detected values indicating motions or organic activities of a crew on the craft, and in the specifying process, the at least one processor specifies the activities, based on not only the craft location data but also the crew data during the navigation.

4. The vessel activity inference device according to claim 3, wherein the crew data contains a chronological series of detected values indicating motions of the crew, the at least one processor further executes a craft rocking-motion data acquiring process of acquiring craft rocking-motion data containing a chronological series of detected values indicating strengths of locking motions of the craft, and a correction process of removing a contribution of the locking motions of the craft to the motions of the crew, from the detected values indicating the motions of the crew, using the crew data and the craft rocking-motion data, and generating corrected crew data indicating motions of the crew relative to the craft, and in the specifying process, the at least one processor specifies the activities, based on not only the craft location data but also the corrected crew data during the navigation.

5. The vessel activity inference device according to claim 1, wherein the at least one processor further executes an equipment-state data acquiring process of acquiring equipment state data containing a chronological series of detected values indicating states of operation or usage of equipment installed in the craft, and in the specifying process, the at least one processor specifies the activities, based on not only the craft location data but also the equipment state data during the navigation.

6. The vessel activity inference device according to claim 1, wherein the specifying process is executed using a learned model generated through machine learning for specifying the activities from the craft location data.

7. A report generation assistance system, comprising:

the vessel activity inference device according to claim 1; and a report generating server to acquire the activity data from the vessel activity inference device, and to generate, based on the acquired activity data, report data indicating achievements of the navigation.

8. A non-transitory computer-readable recording medium storing a vessel activity inference program, the vessel activity inference program causing a computer to serve as:

a craft location data acquirer to acquire craft location data containing a chronological series of detected values indicating locations of a craft during a navigation;

a specifier to specify, based on the craft location data acquired by the craft location data acquirer, activities performed by the craft; and an outputter to output activity data indicating the activities specified by the specifier, wherein the specifier has a function of specifying, based on the craft location data, each of (a) travel toward a search region in which search for a fishery is performed, (b) the search for the fishery in the search region, (c) fishing in the fishery searched, (d) offshore stay, and (e) travel to return to a port after the fishing, as the activities, and specifies the activities multiple times based on the craft location data from departure until arrival of the craft to specify the activities of different types performed during a period from the departure until the arrival of the craft, and the activity data indicates the activities of different types performed during the period from the departure until the arrival of the craft, and a time at which each activity is performed.

9. A seafarer safety device, comprising:

at least one processor, wherein the at least one processor executes an evaluation process of evaluating, based on intensities of notification radio waves indicating existence of a crew on a craft and strengths of rocking motions of the craft detected by a craft rocking-motion sensor, whether the crew is in emergency circumstances, the notification radio waves being received from a wearable transmitting device that repetitively transmits the notification radio waves, the craft rocking-motion sensor repetitively detecting the strengths of the rocking motions, and an outputting process of outputting an emergency evaluation signal indicating a result of evaluation, when the crew is evaluated to be in emergency circumstances in the evaluation process.

10. The seafarer safety device according to claim 9, wherein the evaluation process further includes a low-intensity period determining process of comparing the intensities of the notification radio waves with a threshold radio-wave intensity, and determining a length of a low-intensity period while the intensities of the notification radio waves are lower than the threshold radio-wave intensity, the threshold radio-wave intensity being preliminarily set as a threshold implying existence of the crew on the craft, an initial locking-motion strength determining process of determining, based on the strengths of the rocking motions detected by the craft rocking-motion sensor, an initial locking-motion strength that indicates a strength of locking motions of the craft at start of the low-intensity period, and an evaluation execution process of evaluating, based on the length of the low-intensity period determined in the low-intensity period determining process and the initial locking-motion strength determined in the initial locking-motion strength determining process, whether the crew is in emergency circumstances.

11. The seafarer safety device according to claim 10, wherein when the length of the low-intensity period exceeds an allowable length of low-intensity period, the crew is evaluated to be in emergency circumstances in the evaluation execution process, the allowable length of low-intensity period being set as a threshold implying normal circumstances of the crew, and the evaluation process further includes an allowable low-intensity period setting process of setting the allowable length of low-intensity period to be shorter for a larger initial locking-motion strength determined in the initial locking-motion strength determining process.

12. The seafarer safety device according to claim 9, wherein the notification radio waves contain detected values indicating motions or organic activities of the crew, and in the evaluation process, the at least one processor evaluates, based on not only the intensities of the notification radio waves and the strengths of the rocking motions detected by the craft rocking-motion sensor but also the detected values indicating the motions or organic activities of the crew contained in the notification radio waves, whether the crew is in emergency circumstances.

13. The seafarer safety device according to claim 12, wherein the notification radio waves contain detected values indicating motions of the crew, the evaluation process further includes a correction process of removing a contribution of the locking motions of the craft to the motions of the crew, from the detected values indicating the motions of the crew, using the detected values indicating the motions of the crew contained in the notification radio waves and the strengths of the rocking motions detected by the craft rocking-motion sensor, and generating corrected crew data indicating motions of the crew relative to the craft, and the corrected crew data is used in evaluation of whether the crew is in emergency circumstances.

14. A non-transitory computer-readable recording medium storing a seafarer safety program, the seafarer safety program being configured to cause a computer to serve as:

an evaluator to execute an evaluation process of evaluating, based on intensities of notification radio waves indicating existence of a crew on a craft and strengths of rocking motions of the craft detected by a craft rocking-motion sensor, whether the crew is in emergency circumstances, the notification radio waves being received from a wearable transmitting device that repetitively transmits the notification radio waves, the craft rocking-motion sensor repetitively detecting the strengths of the rocking motions; and an outputter to output an emergency evaluation signal indicating a result of evaluation, when the evaluator evaluates that the crew is in emergency circumstances.

* * * * *